United States Patent
Mather et al.

(10) Patent No.: US 8,632,113 B2
(45) Date of Patent: Jan. 21, 2014

(54) STOWABLE SEAT ARRANGEMENT FOR A MOTOR VEHICLE

(75) Inventors: Carl Mather, Lake Orion, MI (US); Todd R. Teasdale, Canton, MI (US); David M. Savinsky, Clay, MI (US); Dorinel Neag, Walled Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 241 days.

(21) Appl. No.: 13/228,731

(22) Filed: Sep. 9, 2011

(65) Prior Publication Data

US 2013/0062903 A1    Mar. 14, 2013

(51) Int. Cl.
*B60N 2/32* (2006.01)

(52) U.S. Cl.
USPC .... 296/65.09; 296/65.01; 296/66; 297/344.1; 297/15

(58) Field of Classification Search
USPC .............. 296/65.09, 65.01, 66; 297/15, 344.1
See application file for complete search history.

(56) References Cited

U.S. PATENT DOCUMENTS

| | | | |
|---|---|---|---|
| 6,279,982 B1 * | 8/2001 | Nishimura et al. | 296/65.09 |
| 6,869,138 B2 | 3/2005 | Rhodes et al. | |
| 6,955,386 B2 | 10/2005 | Rhodes et al. | |
| 6,962,384 B2 | 11/2005 | Rhodes et al. | |
| 7,066,519 B2 | 6/2006 | Rhodes et al. | |
| 7,077,451 B2 | 7/2006 | Rhodes et al. | |
| 7,377,571 B2 | 5/2008 | Ewers et al. | |
| 2007/0210601 A1 * | 9/2007 | Phillips et al. | 296/37.14 |
| 2008/0224524 A1 | 9/2008 | Mather et al. | |

FOREIGN PATENT DOCUMENTS

| | | |
|---|---|---|
| DE | 19957380 C1 | 3/2001 |
| FR | 2896459 A1 | 7/2007 |
| FR | 2917680 A1 | 12/2008 |
| WO | 2004/043730 A2 | 5/2004 |

OTHER PUBLICATIONS

International Search Report dated Apr. 8, 2013 for International Application No. PCT/US2012/053306, International Filing Date Aug. 31, 2012.
Written Opinion dated Apr. 8, 2013 for International Application No. PCT/US2012/053306, International Filing Date Aug. 31, 2012.

* cited by examiner

*Primary Examiner* — Joseph Pape
(74) *Attorney, Agent, or Firm* — Frederick A. Krieger

(57) ABSTRACT

A seat assembly for a vehicle having a floor can include a seat bottom, a seat back, a pair of front legs and a pair of rear legs. The seat bottom can have a seating side and an opposite lower side facing the floor. The front legs can be pivotably coupled to the vehicle and to the seat bottom via releasable locking mechanisms. The rear legs can be pivotably coupled to the seat bottom and releasably coupled to the vehicle. A pair of linking members can pivotably couple the front and rear legs to each other. The seat assembly can be movable from a deployed to a stowed position whereby the seat bottom can be pivoted forward about the front and rear legs while maintaining the seat bottom lower side facing the floor and the front and rear legs pivotably coupled to the vehicle and the seat bottom.

12 Claims, 31 Drawing Sheets

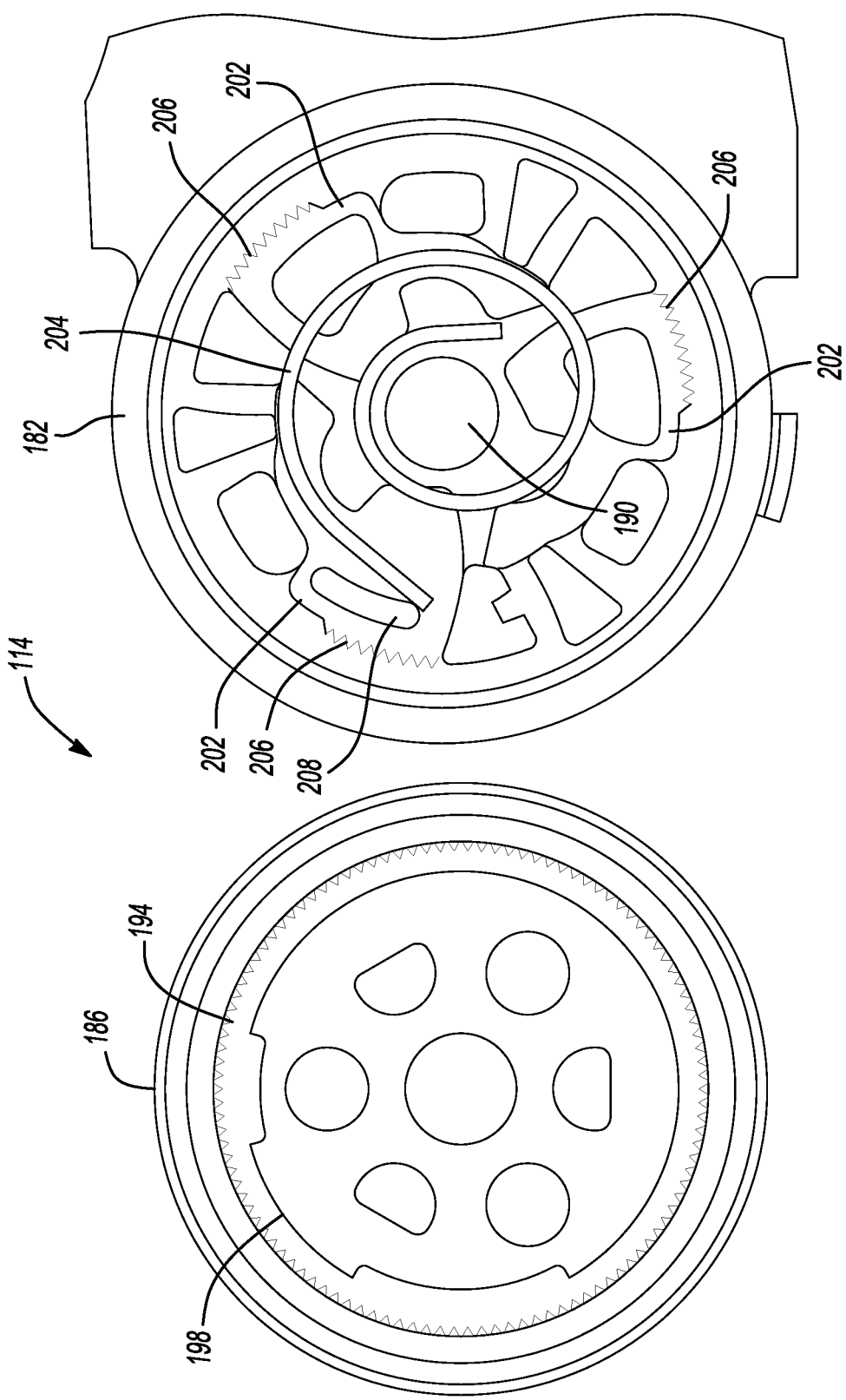

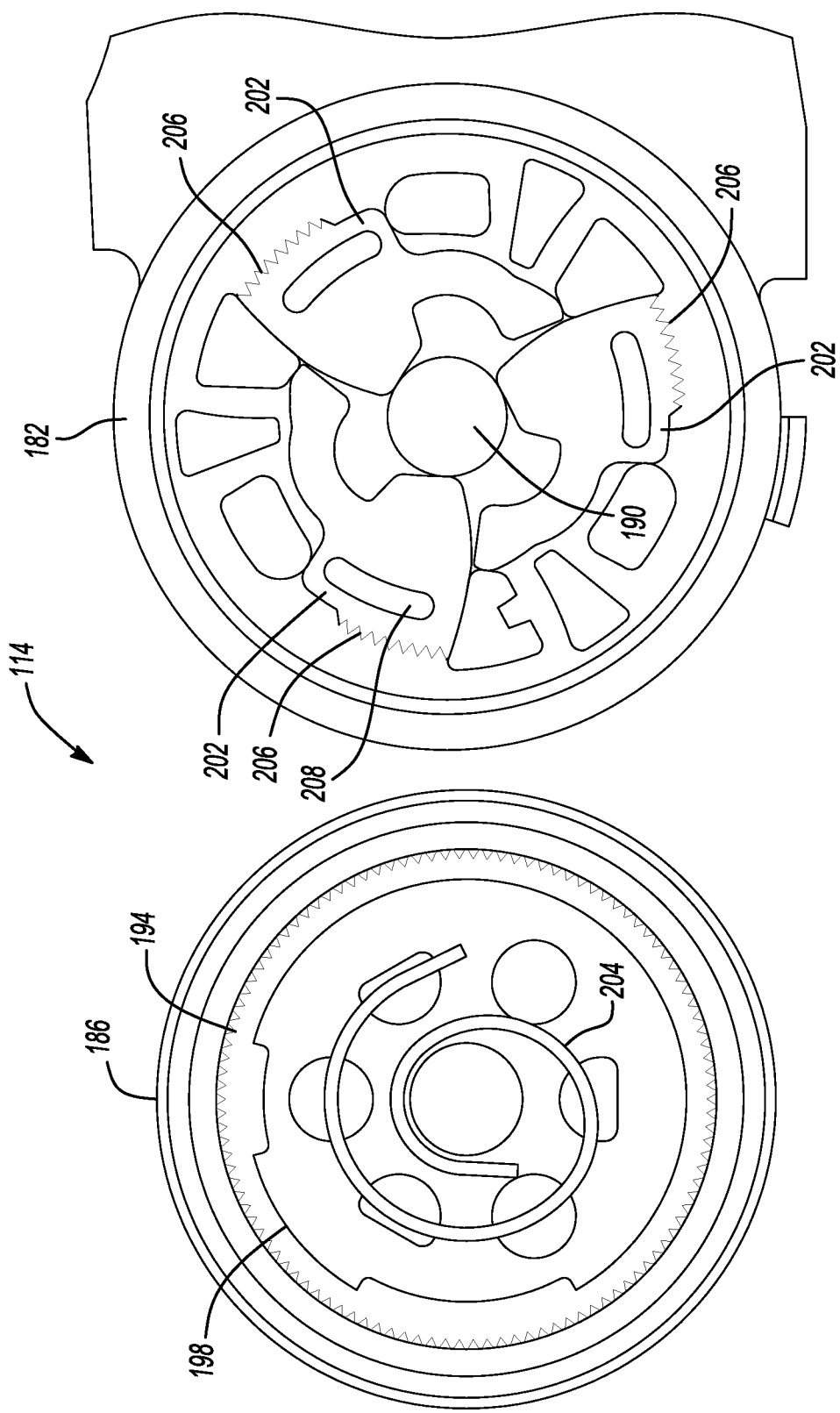

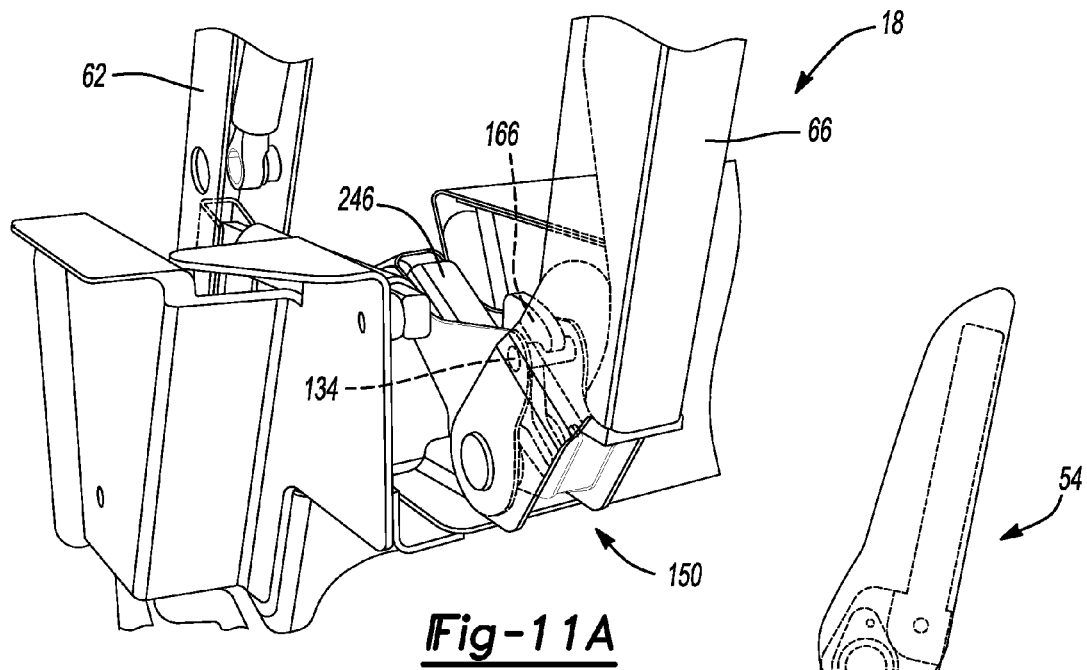
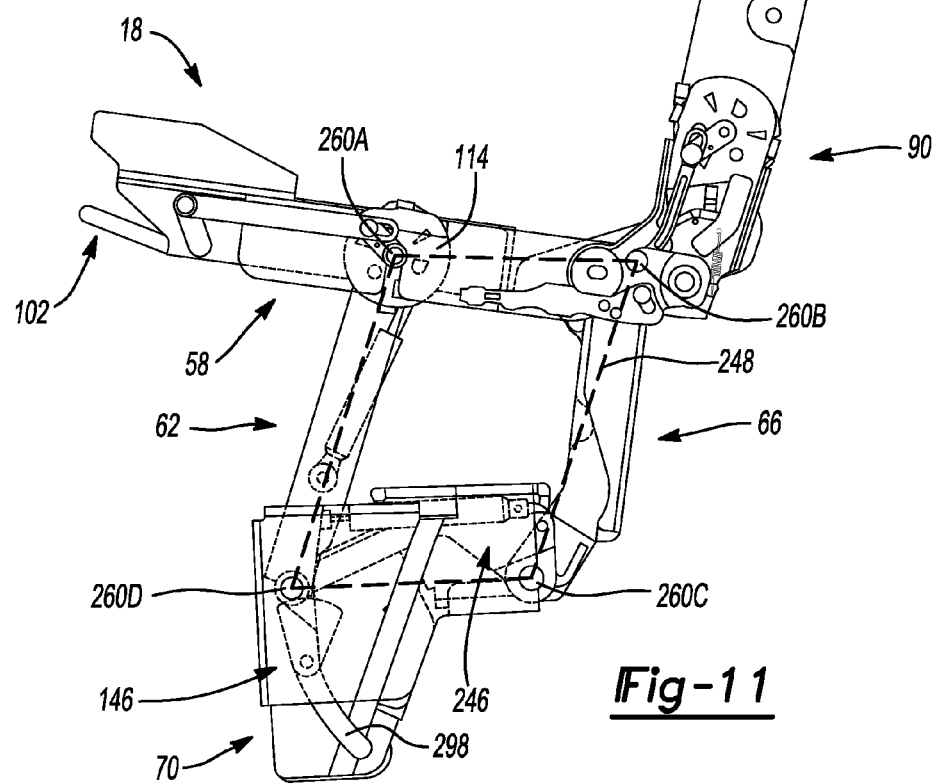

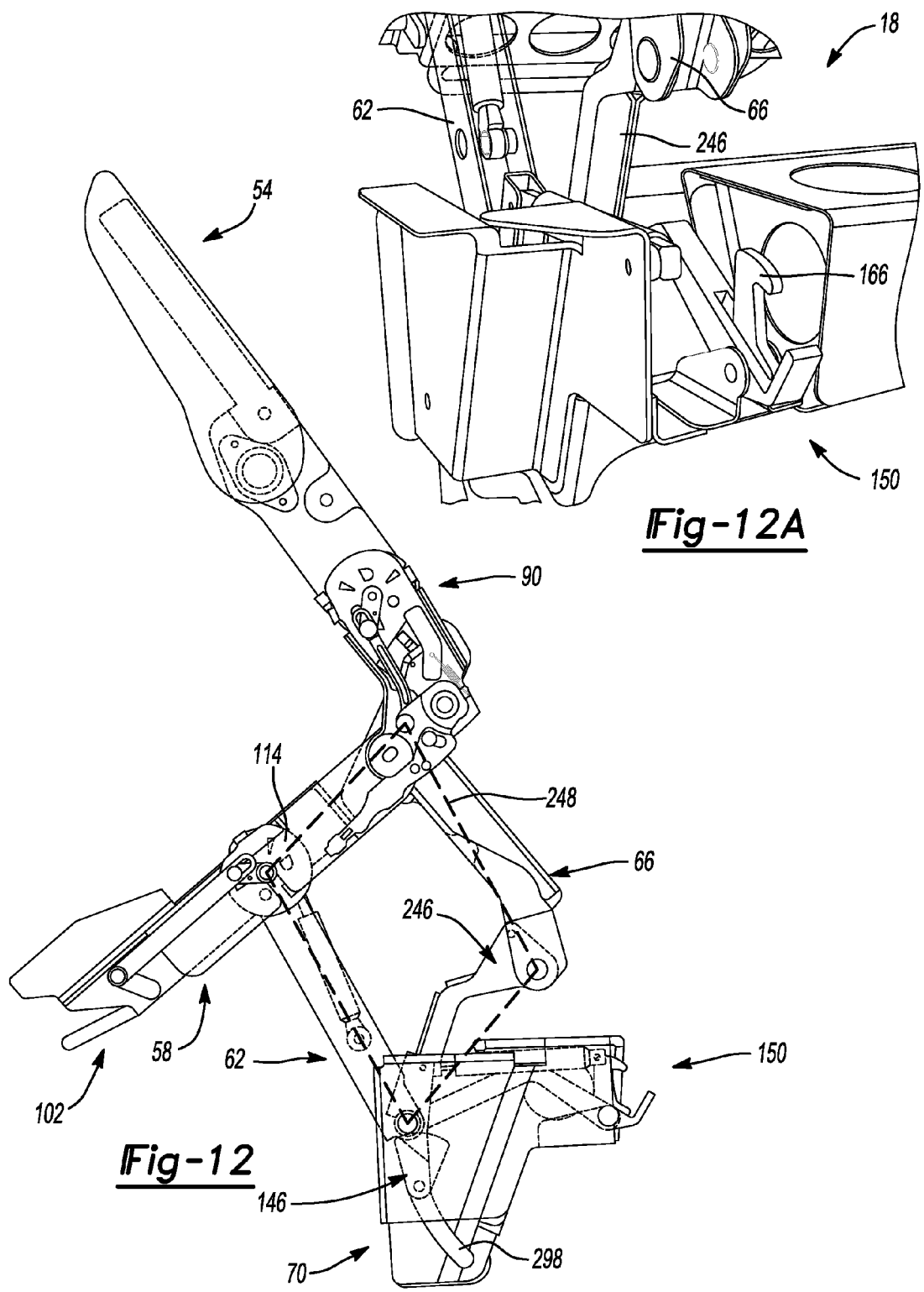

STOWABLE SEAT ARRANGEMENT FOR A MOTOR VEHICLE

FIELD

The present disclosure relates generally to seating arrangements for a motor vehicle and, more particularly, to a stowable seating arrangement for motor vehicles.

BACKGROUND

In motor vehicles such as vans, mini-vans and sport utility vehicles, it is desirable that passenger seating arrangements be optionally stowable on-board the vehicle when not in use to provide additional or improved storage capacity for carrying cargo. One potential solution to this desire for additional storage capacity is a seat assembly that is capable of being stowed to provide a flat load floor. One drawback of the current stowable seat assemblies is the complexity of the arrangements utilized to facilitate stowage of the seats. Another drawback of the current stowable seat assemblies is a need for the seats to be turned or flipped upside down such that a seating side of the seat bottom is facing a floor of a stowage tub in order to stow the seat assembly. To deploy the stowed seat, a user will then typically need to rotate the seat in an opposite manner from the stowed position in the stowage tub.

Thus, while stowable seat assemblies have generally worked for their intended purpose, there remains a need for continuous improvement in the relevant art.

SUMMARY

In one form, a stowable seat assembly for a motor vehicle having a floor can include a seat bottom, a seat back, a front pair of legs and a rear pair of legs. The seat bottom can have a forward portion and an opposite rearward portion, as well as an upper or seating side and an opposite lower side facing the vehicle floor. The seat back can have an upper portion and a lower portion that can be pivotably coupled to the seat bottom rearward portion. The front pair of legs can each have an upper end and an opposite lower end, where each upper end can be pivotably coupled to respective first and second lateral sides of the forward portion of the seat bottom via releasable locking mechanisms. Each lower end can be pivotably coupled to the vehicle via first latch mechanisms configured to enable selective translation of the front legs. The rear pair of legs can each be pivotably coupled at an upper end to the respective first and second lateral sides of the seat bottom at the rearward portion, and can be releasably coupled at a lower end to a second latch mechanism selectively securing the rear legs to the vehicle. A pair of linking members can pivotably couple the lower ends of the front and rear legs coupled to the first lateral side of the seat bottom to each other, and the front and rear legs coupled to the second lateral side of the seat bottom to each other. The linking members can be adapted to be disposed below the floor of the vehicle. The seat assembly can be selectively movable from a deployed position to a stowed position whereby the seat bottom can be pivoted forward about the front and rear legs to the stowed position while maintaining the lower side of the seat bottom facing the vehicle floor and the front and rear legs pivotably coupled to the vehicle and the seat bottom.

In another form, a stowable seat assembly for a motor vehicle having a floor can include a seat bottom, a seat back, a front pair of legs and a rear pair of legs. The seat bottom can have a forward portion and an opposite rearward portion, as well as an upper or seating side and an opposite lower side facing the vehicle floor. The seat back can have an upper portion and a lower portion that is pivotably coupled to the seat bottom rearward portion. The front pair of leg assemblies can each have an upper end and an opposite lower end, where each upper end can be pivotably coupled to respective first and second lateral sides of the forward portion of the seat bottom and each lower end can be pivotably coupled to the vehicle. The rear pair of legs can each be pivotably coupled at an upper end to the respective first and second lateral sides of the seat bottom at the rearward portion, and can be releasably coupled to the vehicle at a lower end via a rear leg latch mechanism. A pair of linking members can have first and second ends pivotably coupling the respective upper ends of the front and rear legs coupled to the first lateral side of the seat bottom to each other and the respective upper ends of the front and rear legs coupled to the second lateral side of the seat bottom to each other. The first ends of the linking members can be movably coupled to the forward portion of the seat bottom. The seat assembly can be selectively movable from a deployed position to a stowed position where the seat bottom can be pivoted forward about the front legs to the stowed position while maintaining the lower side of the seat bottom facing the vehicle floor. The linking members can automatically rotate the rear legs to a retracted position as the seat assembly is selectively moved from the deployed position to the stowed position.

In yet another form, a motor vehicle includes a floor, a seat receiving recess formed into the floor, and a plurality of stowable seat assemblies. The seat receiving recess can include at least one cover moveable between an open position and a closed position flush with the floor. The plurality of stowable seat assemblies can each include a seat bottom, a seat back, a front pair of legs and a rear pair of legs. The seat bottom can have a forward portion and an opposite rearward portion, as well as an upper or seating side and an opposite lower side facing the vehicle floor. The seat back can have an upper portion and a lower portion that is pivotably coupled to the seat bottom rearward portion. The front pair of legs can each have an upper end and an opposite lower end, where each upper end can be pivotably coupled to respective first and second lateral sides of the forward portion of the seat bottom via releasable locking mechanisms. Each lower end can be pivotably coupled to the vehicle via first latch mechanisms configured to enable selective translation of the front legs. The rear pair of legs can each be pivotably coupled at an upper end to the respective first and second lateral sides of the seat bottom at the rearward portion, and can be releasably coupled at a lower end to a second latch mechanism selectively securing the rear legs to the vehicle. A pair of linking members can pivotably couple the lower ends of the front and rear legs coupled to the first lateral side of the seat bottom to each other and the front and rear legs coupled to the second lateral side of the seat bottom to each other. The linking members can be disposed below the floor of the vehicle. Each seat assembly can be selectively movable from a deployed position to a stowed position in the seat receiving recess whereby the seat bottom is pivoted forward about the front and rear legs to the stowed position while maintaining the lower side of the seat bottom facing the vehicle floor and the front and rear legs coupled to the vehicle and the seat bottom. Each seat assembly being in the deployed position can form a cross-car bench seat configuration and each seat assembly being in the stowed position can form a flat load floor configuration.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention

BRIEF DESCRIPTION OF THE DRAWINGS

FIG. 9 is an exploded view of an exemplary rotational adjustment/locking mechanism illustrating locking pawls in an engaged position according to the principles of the present disclosure;

FIG. 10 is an exploded view of the rotational adjustment/locking mechanism of FIG. 9 illustrating the locking pawls in a disengaged position according to the principles of the present disclosure;

FIG. 11 is a side view of an outboard seat in a deployed position according to the principles of the present disclosure;

FIG. 11A is a perspective view of an attachment arrangement for an exemplary rear leg of the outboard seat of FIG. 11 according to the principles of the present disclosure;

FIG. 12 is a side view of the outboard seat of FIG. 11 moved to an ingress/egress position according to the principles of the present disclosure;

FIG. 12A is a perspective view of the attachment arrangement of FIG. 11A illustrating the rear leg released therefrom according to the principles of the present disclosure;

FIG. 17A is a rear view of the outboard seat of FIG. 17 illustrating the latch mechanism according to the principles of the present disclosure;

DETAILED DESCRIPTION

Figure 1:
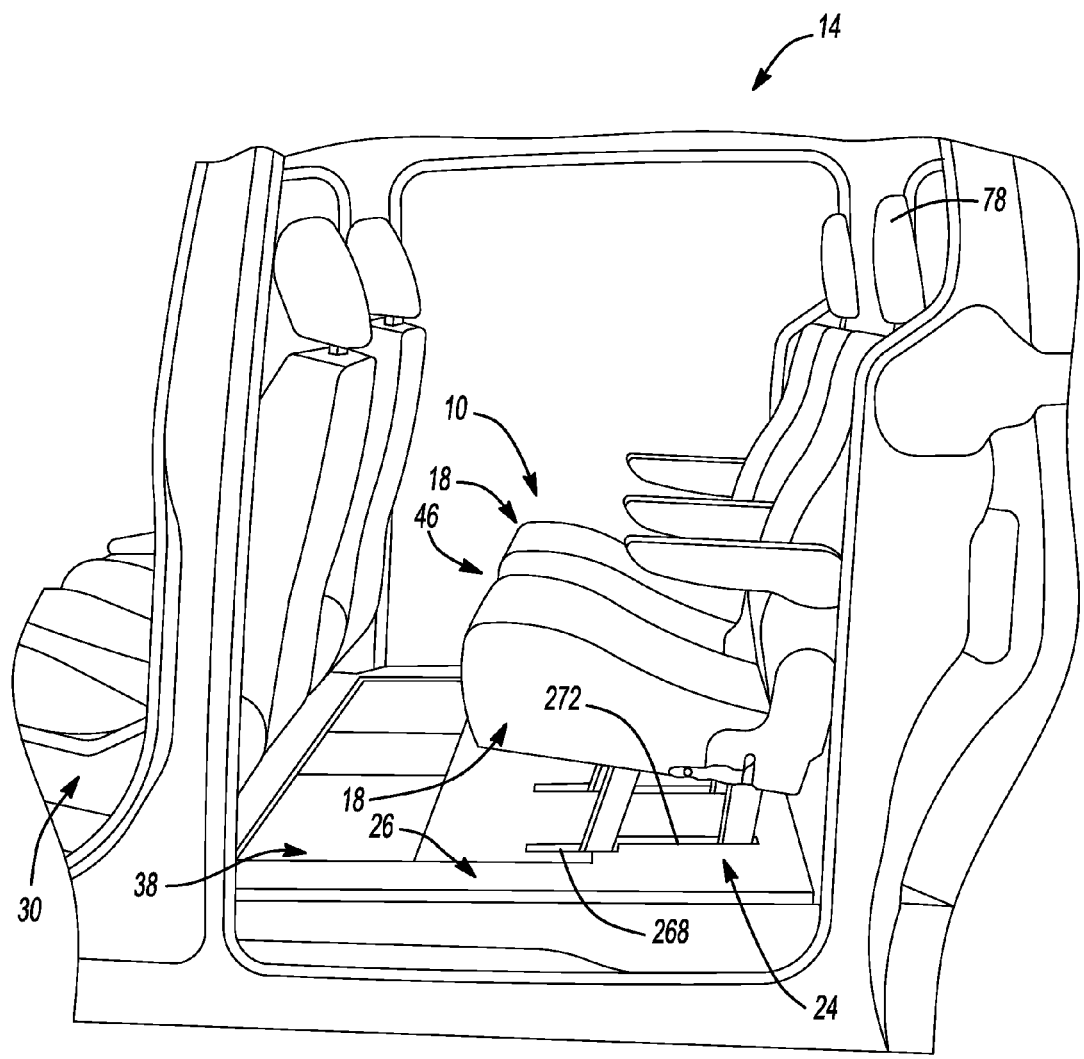
FIG. 1 is a side view of an exemplary, second row seating arrangement in a motor vehicle illustrating outboard seats in an exemplary deployed position and a center seat in a stowed position according to the principles of the present disclosure.

With initial reference to FIGS. 1-6, a stowable seating arrangement 10 is provided for a motor vehicle 14 in accordance with the present teachings and can include outboard seat assemblies 18 and an inboard or center seat assembly 22. As shown, the seating arrangement 10 may be for a second row of seating 24 for the vehicle 14 and can include outboard seat assemblies 18 and center seat assembly 22 in a side-by-side configuration. Vehicle 14 can generally include a floor 26, a first row of seating 30, a stowage recess 34 configured to receive the stowable seating arrangement 10, and stowage recess covers 38 for covering the recess.

Figure 3:
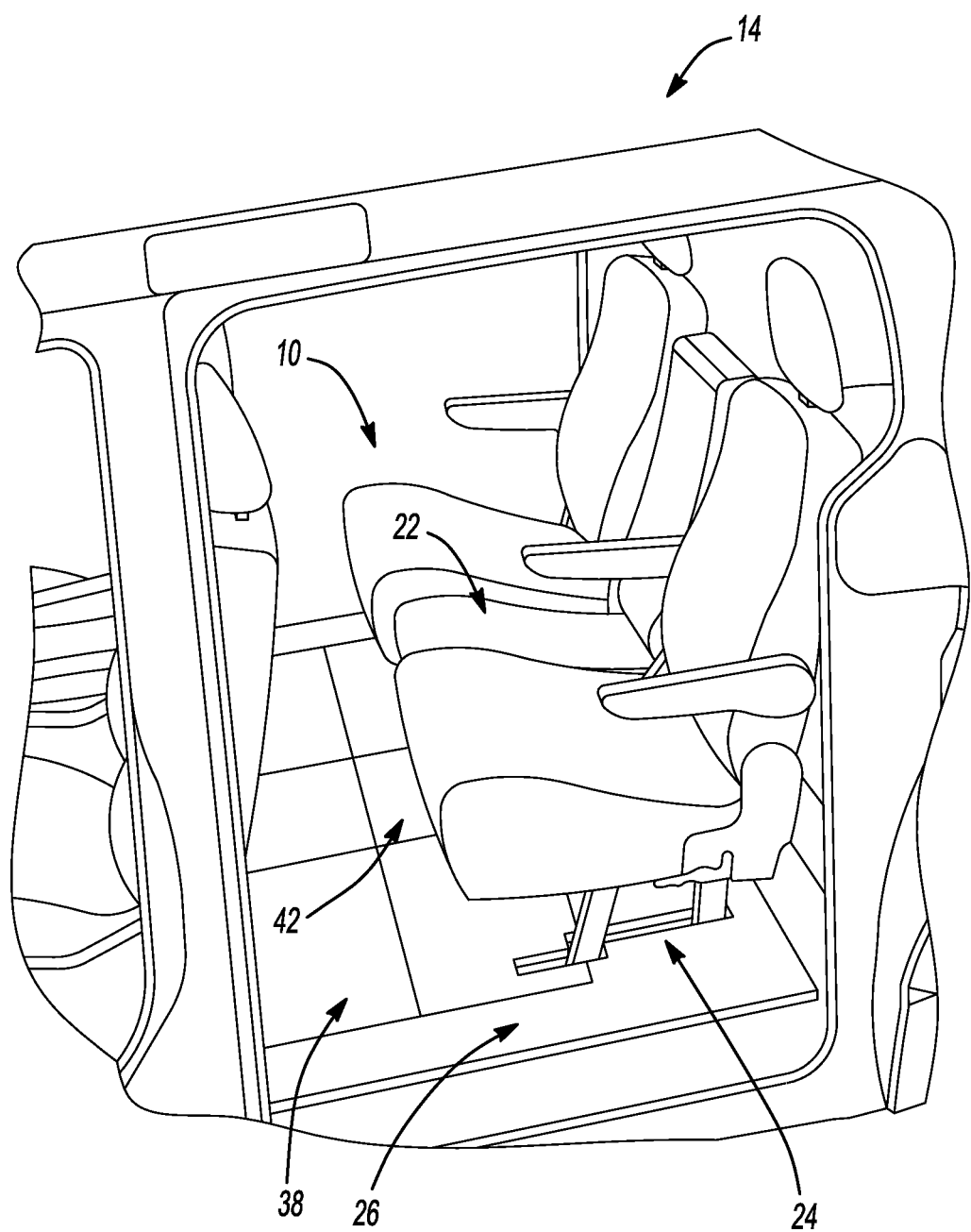
FIG. 3 is a perspective view of an exemplary second row seating arrangement illustrating the outboard seats and the center seat in an exemplary deployed position according to the principles of the present disclosure.
Figure 4:
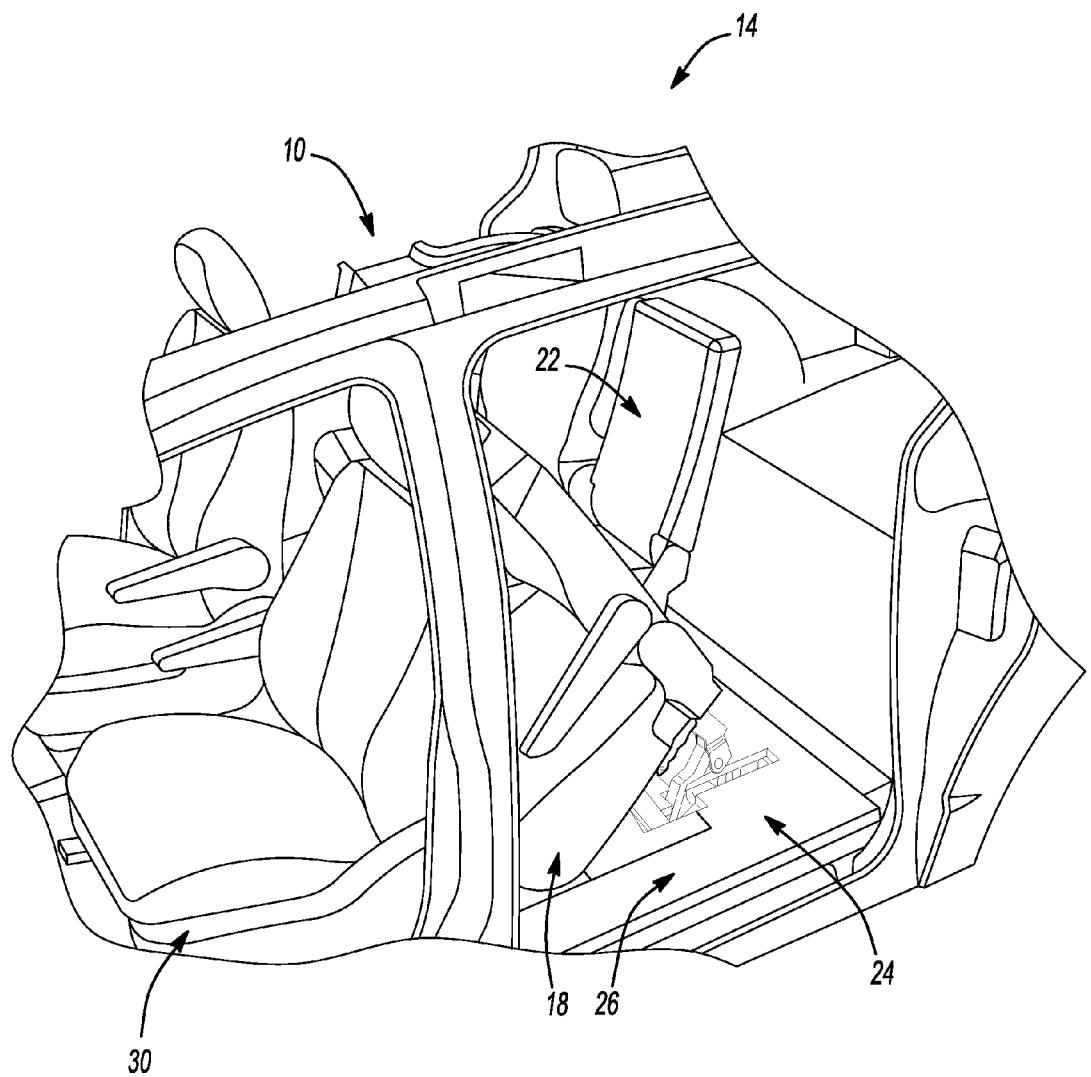
FIG. 4 is a partial perspective view of an exemplary second row seating arrangement illustrating an outboard seat in an exemplary ingress/egress position according to the principles of the present disclosure.
Figure 5:
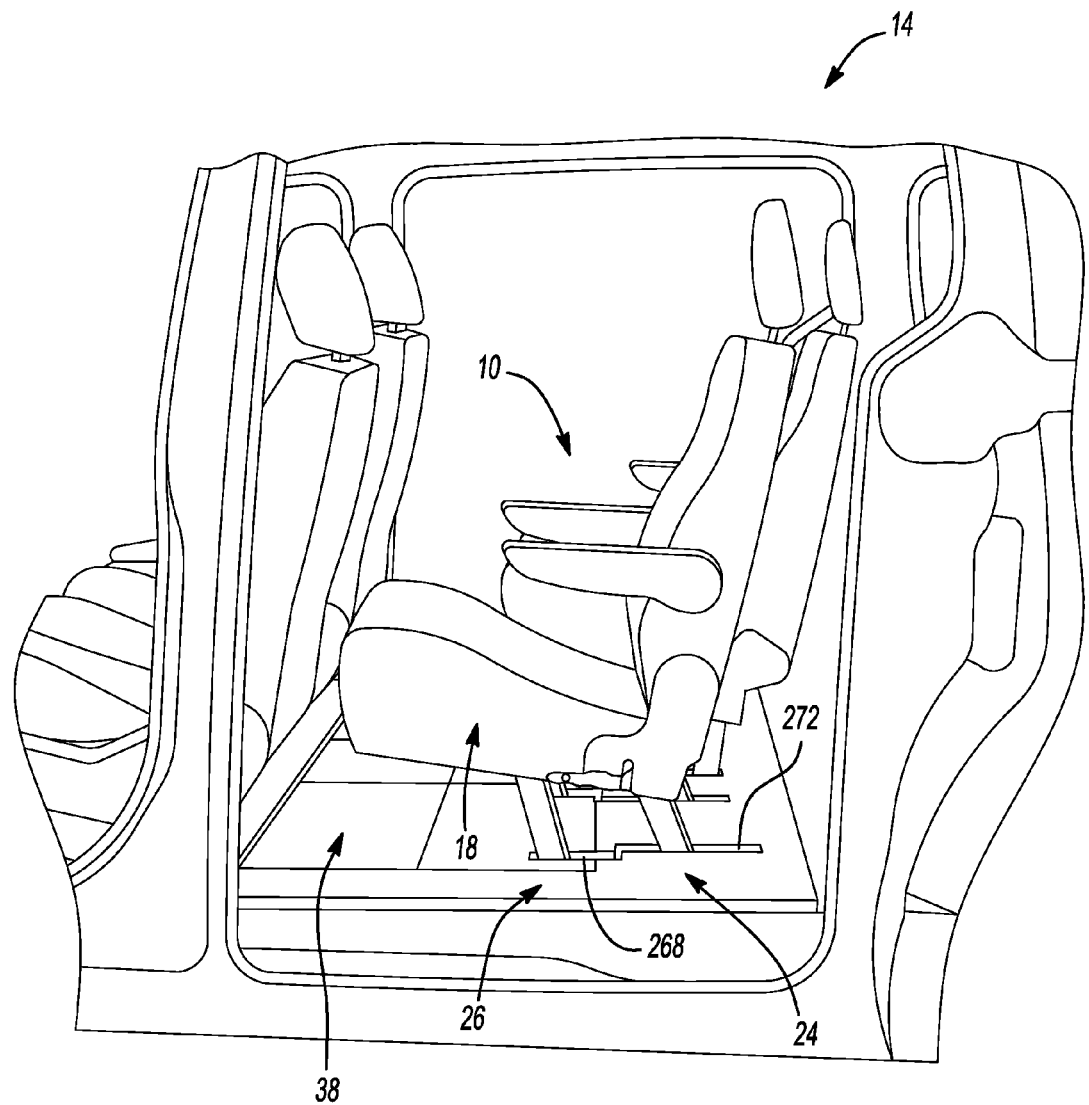
FIG. 5 is a side view of an exemplary second row seating arrangement illustrating fore-aft adjustment of an outboard seat according to the principles of the present disclosure.
Figure 6:
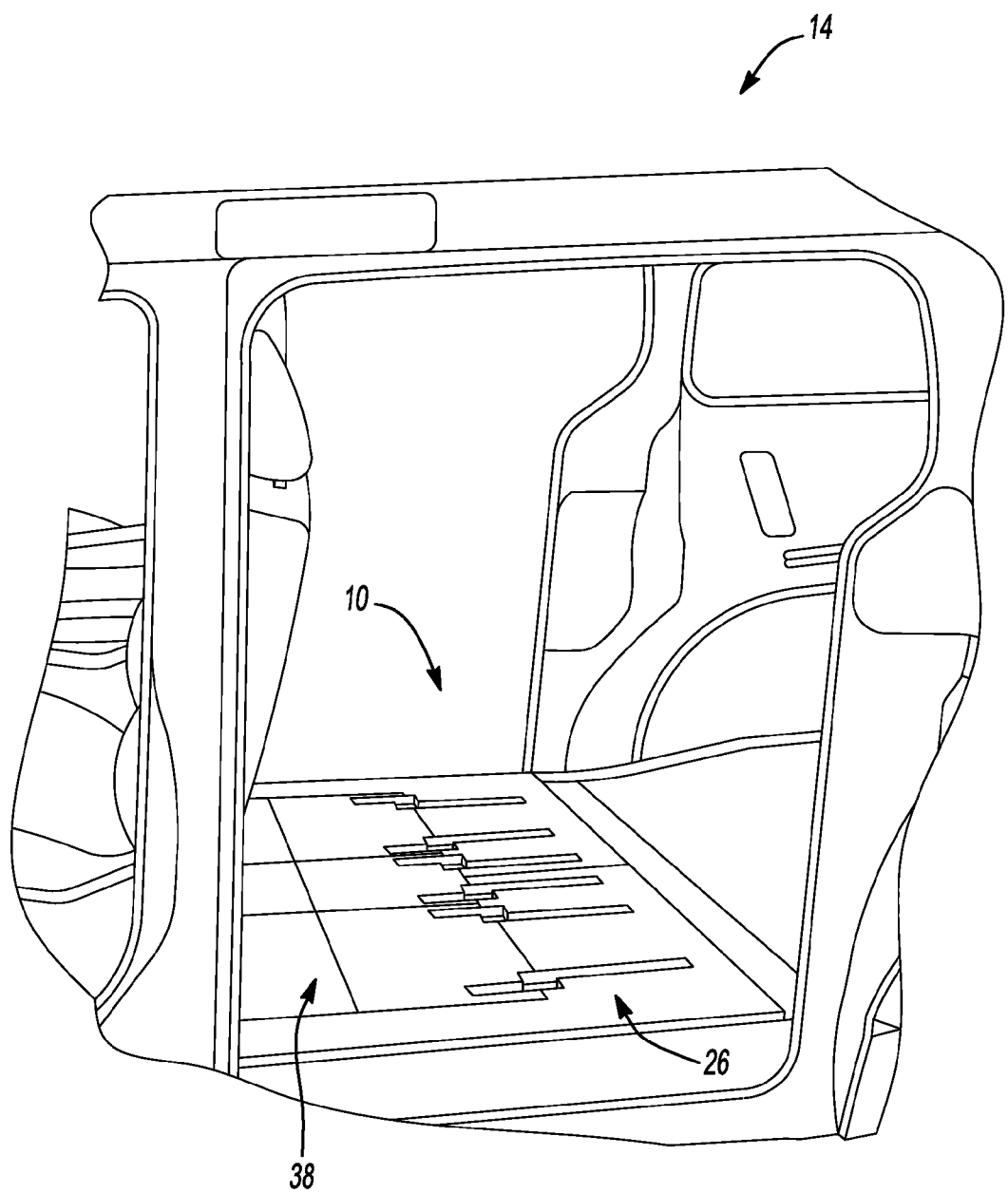
FIG. 6 is a side view of an exemplary second row seating arrangement with each seat in a stowed position according to the principles of the present disclosure.

As will be discussed in greater detail below, each of the seat assemblies 18, 22 can be individually stowed into the stowage recess 34 to provide a flat load floor vehicle configuration, as shown in FIG. 6. In this manner, when outboard seat assemblies 18 and center seat assembly 22 are deployed, as shown in FIG. 3, a bench seating arrangement 42 can be provided. When the center seat assembly 22 is stowed, a passageway 46 can be provided to a rearward area of the vehicle for access to a cargo area and/or a third row of seating (not shown). In addition to being stowable, the seat assemblies 18, 22 of the present teachings can also include ingress/egress adjustment capabilities, as generally shown in FIG. 4, as well as fore-aft adjustment capabilities, as generally shown in FIG. 5. Each of these features will also be discussed in greater detail below.

With additional reference to FIGS. 7-19, the outboard seat assemblies 18 will now be discussed in greater detail. It should be appreciated that outboard seat assemblies 18 and center seat assembly 22 can include the same or substantially the same configuration, or center seat assembly 22 can include an alternative configuration as will be discussed below in connection with FIGS. 20-28. It should also be appreciated that several features of seat assembly 18 will be discussed below in connection with an outboard side 50 of seat assembly 18 shown in the figures. In this regard, when duplicate components are discussed, such as a pair of front legs and an associated pair of brackets, it should be appreciated that an inboard side of the seat assembly opposite the outboard side 50 can have the same structure and operation with respect to such components and/or features and will thus not be further discussed herein.

Figure 7:
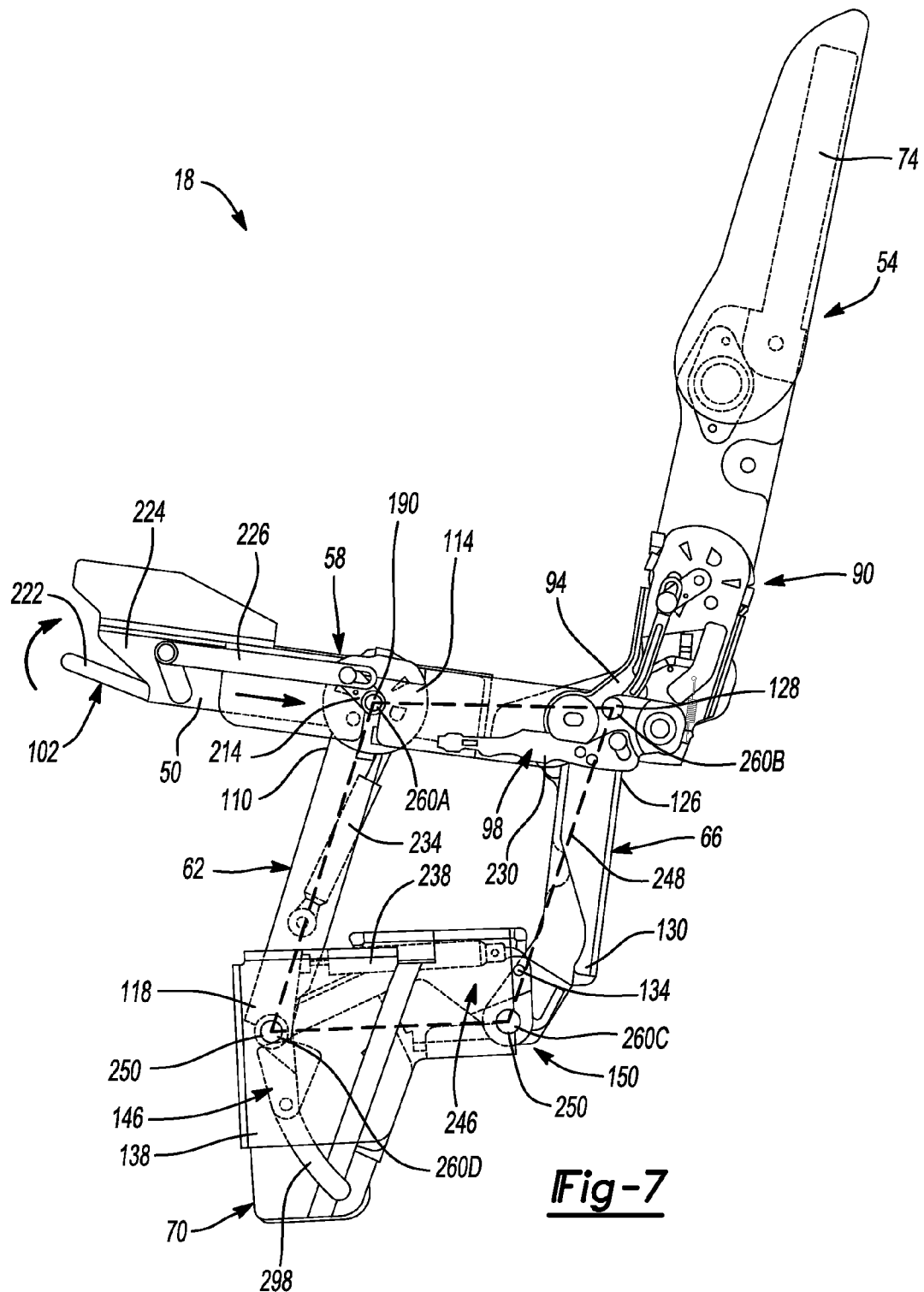
FIG. 7 is a side view of an exemplary outboard seat in a deployed position according to the principles of the present disclosure.
Figure 30:
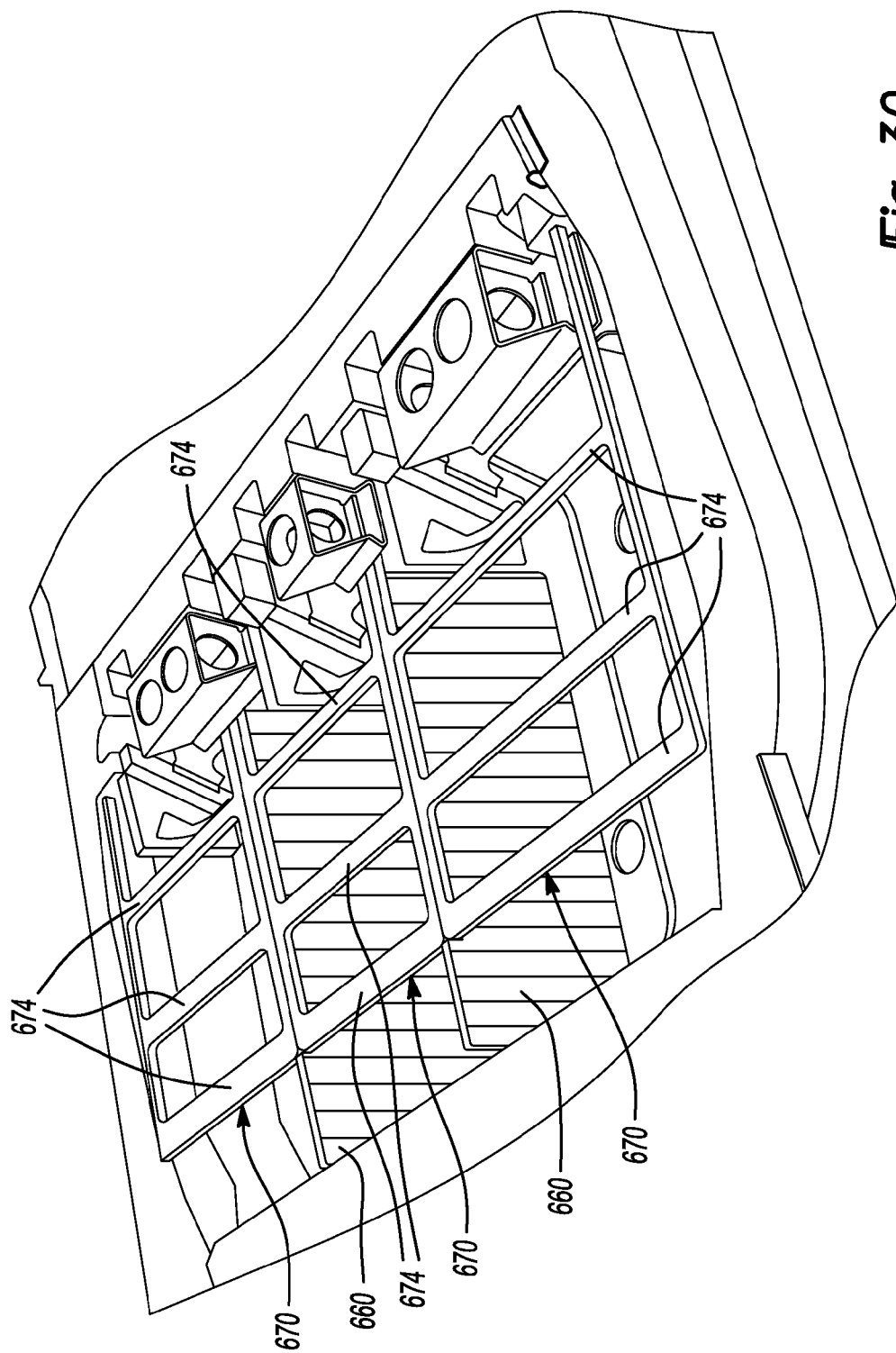
FIG. 30 is a perspective view of the vehicle floor configuration of FIG. 29 illustrating a support structure for the covers of the recess according to the principles of the present disclosure.

In one exemplary configuration and referring to FIG. 7, outboard seat assembly 18 can include a seat back 54, a seat bottom 58, a first pair of front legs 62, a second pair of rear legs 66 each operatively associated with the seat bottom 58, and a pair of attachment arrangements 70 operatively associated with the front and rear legs 62, 66 and a frame of the vehicle (FIG. 30). It should be appreciated that the outboard seat assembly 18 is shown in FIGS. 7-19 without seat back and seat bottom cushions as well as other appropriate trim components for purposes of clarity and can include such cushions and trim components as shown, for example, in FIGS. 1-5.

Seat back 54 can include a pair of arm rests 74 and a head rest 78 (FIG. 1) each coupled to the seat back 54 in any suitable manner. Seat back 54 can also include first and second release mechanisms 82, 86 (FIG. 13) and a pair of releasable coupling/locking mechanisms 90 pivotably coupling seat back 54 to seat bottom 58 via brackets 94 as shown in FIG. 7. Seat bottom 58 can be attached to brackets 44 at a rearward end thereof and can include a third release mechanism 98 and a fourth release mechanism 102, as will also be discussed below.

A first or upper end 110 of each leg of the front legs 62 can be pivotably coupled to a respective rotational adjustment/locking mechanism 114, which can be coupled to a respective side of seat bottom 58, as shown for example in FIG. 7. A second or lower end 118 of legs 62 can be coupled to a respective attachment arrangement 70 for selective movement relative thereto, as will be discussed below. A first or upper end 126 of rear legs 66 can each be pivotably coupled at member 128 to a respective side of seat bottom 58. A second or lower end 130 of rear legs 66 can each include a pin member 134 for releasably coupling rear legs 66 to respective attachment arrangements 70, as generally shown in FIGS. 7, 11A and 12A.

Each attachment arrangement 70 can include a bracket 138 that can be attached to the vehicle frame or alternatively integrally formed with the vehicle frame. Each bracket 138 can be associated with a respective front and rear leg of the pair of front and rear legs 62, 66 and can include a latch mechanism 146 operatively associated with a respective front leg 62 and a latch mechanism 150 releasably receiving a respective pin member 134 of rear legs 66.

Figure 13:
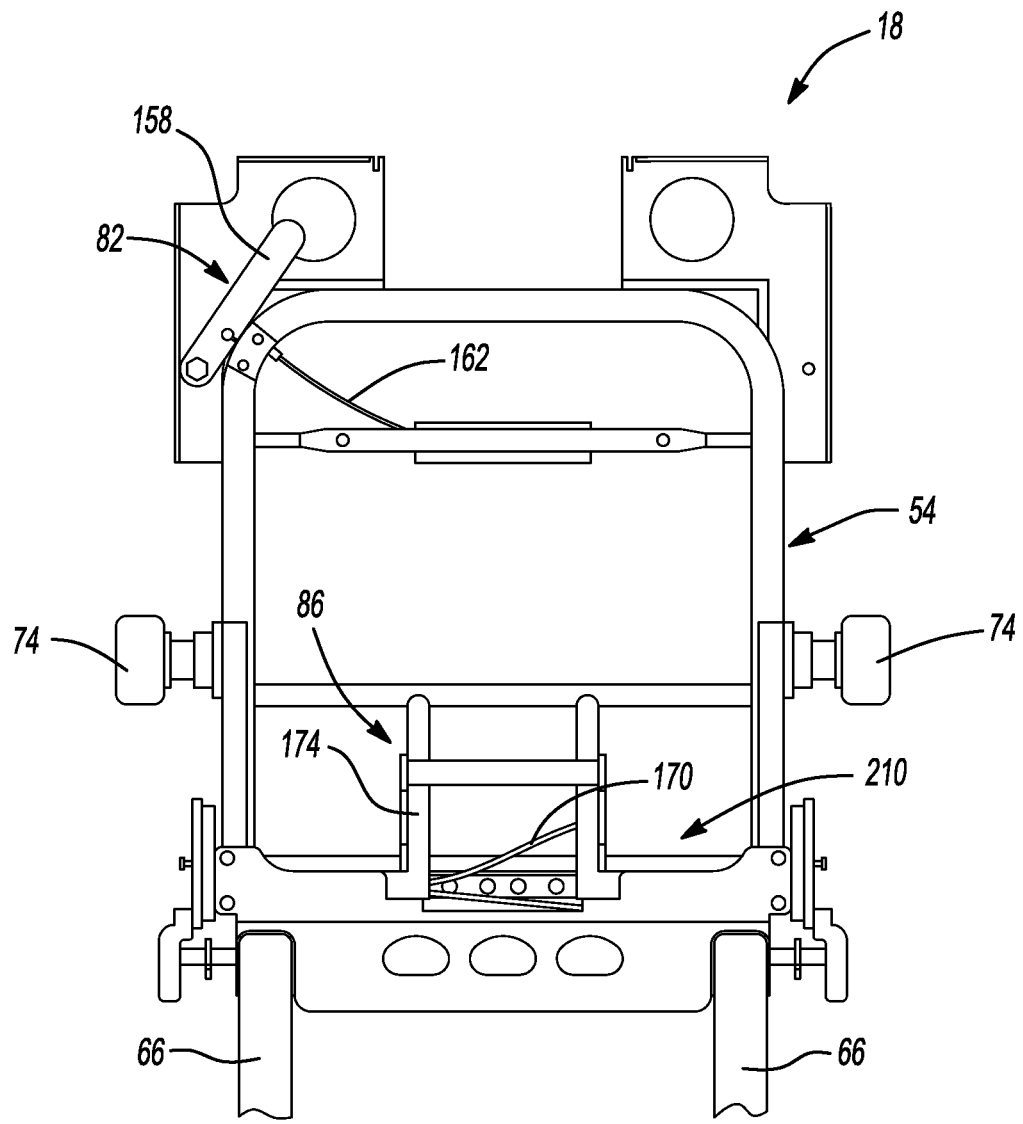
FIG. 13 is a rear view of an exemplary outboard seat in a deployed position according to the principles of the present disclosure.

The first release mechanism 82 can be operatively associated with each of the latch mechanisms 150 such that upon actuation of the release mechanism 82, each latch mechanism 150 can release from the respective pin member 134. In one exemplary configuration, release mechanism 82 can include an actuation member 158 and a cable 162 attached at one end to the actuation member 158 and to each latch mechanism 150 at an opposite end, as generally shown in FIG. 13. While release mechanism 82 is shown in an upper outboard corner of seat back 54, it should be appreciated that release mechanism 82 can be located in various positions on or adjacent seat assembly 18. Latch mechanisms 150 can each include a latch member 166 configured to selectively engage in member 134 to secure rear legs 66 to respective brackets 138, as generally shown in a latched position in FIG. 11A and an unlatched position in FIG. 12A.

With additional reference to FIGS. 9-10, each rotational adjustment/locking mechanism 114 can include a first housing member 182, a second housing member 186, and an actuation shaft 190 that also serves as a pivot and coupling point. First housing member 182 can be fixed to seat bottom 58 and second housing member 186 can be fixed to a respective front leg 62. The second housing member 186 can include a toothed outer case 194 and spaced apart projections 198. Each rotational adjustment/locking mechanism 114 can further include a plurality of pawls 202 and a spring 204 operatively associating pawls 202 to shaft 190. Each pawl 202 can include an outer toothed profile 205 configured to selectively engage toothed outer case 194. At least one of the pawls 202 can include a protrusion 208 to prevent pawls 202 from engaging toothed outer case 194 thereby allowing free movement of the housing members 182, 186 relative to each other, and thus the front legs 62 relative to the seat bottom 58, for predetermined rotational ranges.

Figure 17:
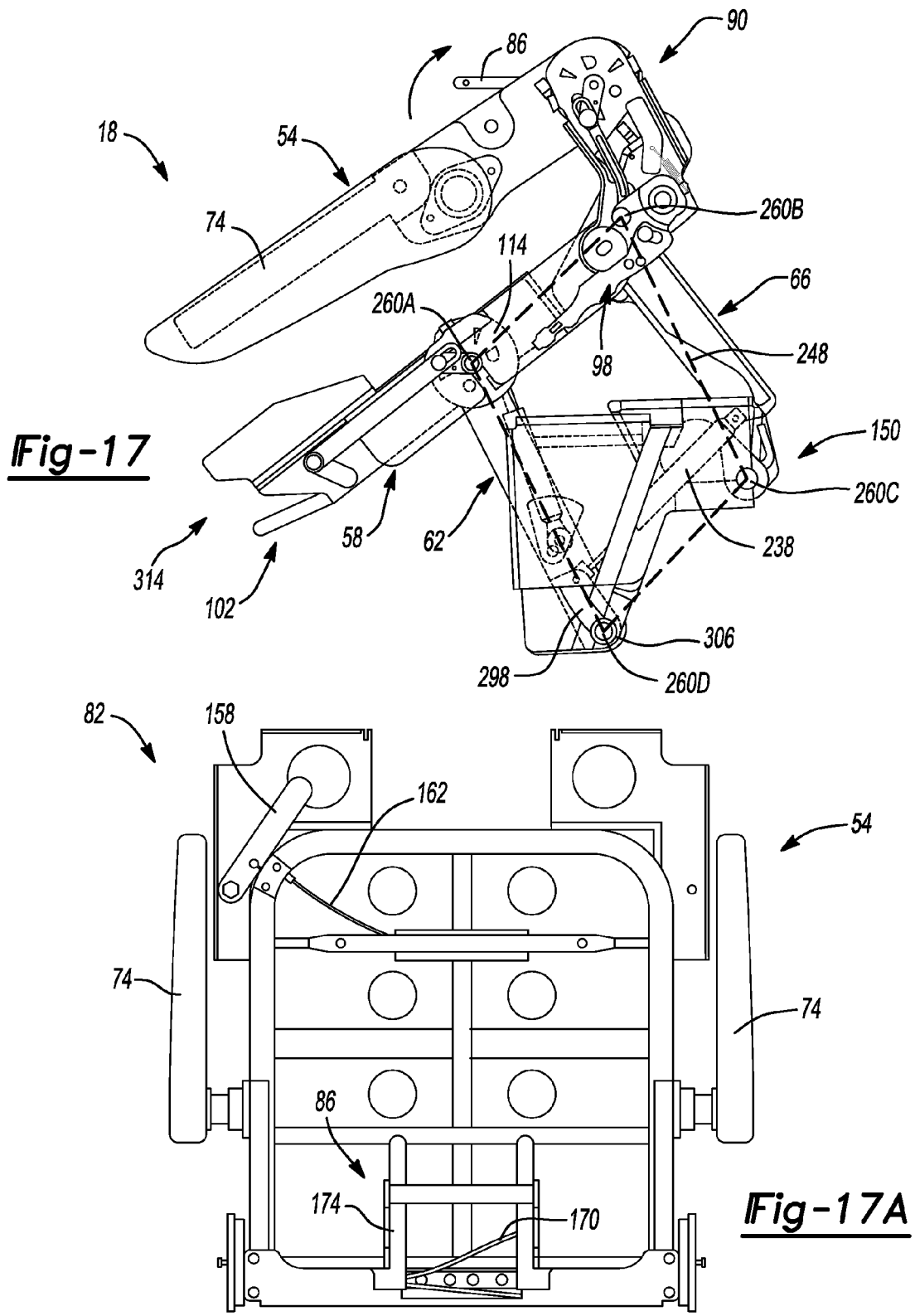
FIG. 17 is a side view of the outboard seat of FIG. 16 moved to a forward tipped position and illustrating actuation of a latch mechanism to release the rotational adjustment/locking mechanism according to the principles of the present disclosure.

The second release mechanism 86 can be operatively coupled to the actuation shaft 190 of each of the rotational adjustment/locking mechanisms 114 via a cable 170 or other suitable connection arrangements. Release mechanism 86 can include a handle 174 or other member configured to facilitate convenient engagement by a user. In one exemplary configuration, release mechanism 86 can be positioned at a lower central portion 210 of seat back 54 for convenient access when seat back 54 is in a collapsed position, as generally shown in FIGS. 17 and 17A. Actuation of the release mechanism 86 can rotate shaft 190 via lever 214 (FIG. 7) to disengage pawls 202 from toothed outer case 194 (FIG. 10) to facilitate pivotal movement of the front legs 62 relative to seat bottom 58 when stowing the seat assembly 18, as will be discussed in greater detail below.

In a similar manner, the fourth release mechanism 102 can also be operatively connected to the rotational adjustment/locking mechanisms 114 to facilitate fore-aft adjustment of the seat assembly 18. In one exemplary configuration, the fourth release mechanism 102 can include an actuation member 222 extending along a forward end 224 of the seat bottom 58 and can be operatively coupled to a linking member 226, which can be coupled to lever 214, as shown in FIG. 7. Actuation of the fourth release mechanism 102 can rotate shaft 190 to disengage pawls 202 and allow rotational adjustment of the housing members 182, 186 relative to each other in a manner similar to the operation of release mechanism 86 discussed above.

Figure 15:
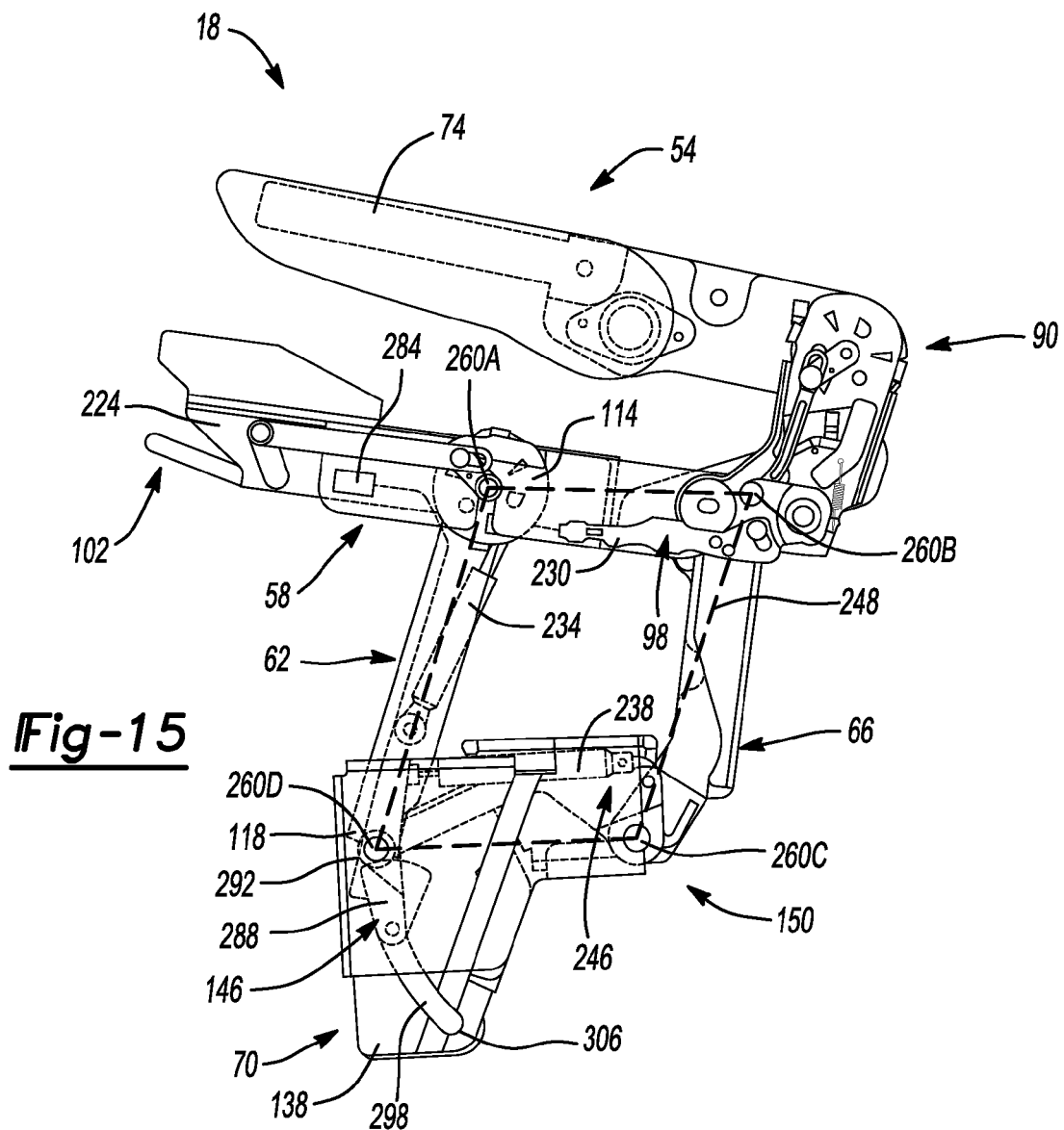
FIG. 15 is a side view of the outboard seat of FIG. 14 with the seat back collapsed according to the principles of the present disclosure.

The third release mechanism 98 can include a handle or actuation member 174 and can be operatively associated with each of the releasable coupling/locking mechanisms 90. Moving the actuation member 230 to a first position can permit pivotal adjustment of seat back 54 relative to seat bottom 58 within a predetermined range. Moving actuation member 230 to a second position can be operable to fold or collapse seat back 54 to a collapsed position generally parallel to seat bottom 58, as shown in FIG. 15. Releasing actuation member 230 can lock seat back 54 in a desired adjustment position or the collapsed position. In one exemplary configuration, release mechanism 98 can be positioned about outboard side 50 of seat bottom 58, as shown for example in FIG. 7.

Seat assembly 18 can further include a damper, such a gas strut damper assembly 234, pivotably coupled to the seat bottom 58 at one end and to a lower portion 242 of one of the front legs 62 at an opposite end. A pair of linking members 246 can pivotably couple a respective inboard set of front and rear legs 62, 66 to each other and a respective outboard set of front and rear legs 62, 66 to each other, as also generally shown in FIG. 7. Pivot members 250 can couple linking member 246 to lower end 118 of the front legs 62 and lower end 130 of the rear legs 66. Linking members 246 can cooperate with the front and rear legs 62, 66 to maintain a pivotable relationship therebetween when, for example, the front and rear legs 62, 66 are released from their respective latch mechanisms. Seat assembly 18 can also include another damper assembly 238 pivotably coupled to a forward portion of one of the linking members 246 and a rearward portion of one of the bracket assemblies 138 adjacent latch mechanism 150, as shown for example in FIG. 8. Dampers 234, 238 can be tuned to provide biasing forces and control a collapsing motion of seat assembly 18 during stowage, as will be discussed below.

The linking members 246 together with the front and rear legs 62, 66 and seat bottom 58 can form a four-bar pivoting link configuration 248 having pivot points 260A-D (FIG. 7) that cooperate during the fore-aft adjustment feature, ingress/egress feature, and stowage feature of seat assembly 18, as will be discussed in greater detail below. Pivot points 260A and 260B can be spaced apart along seat bottom 58 where pivot point 260A can correspond to shaft 190 and pivot point 260B can correspond to member 128, as shown in FIG. 7. Similarly, pivot points 260C and 260D can be associated with pivot members 250 at the lower ends 118, 130 of front and rear legs 62, 66.

Figure 8:
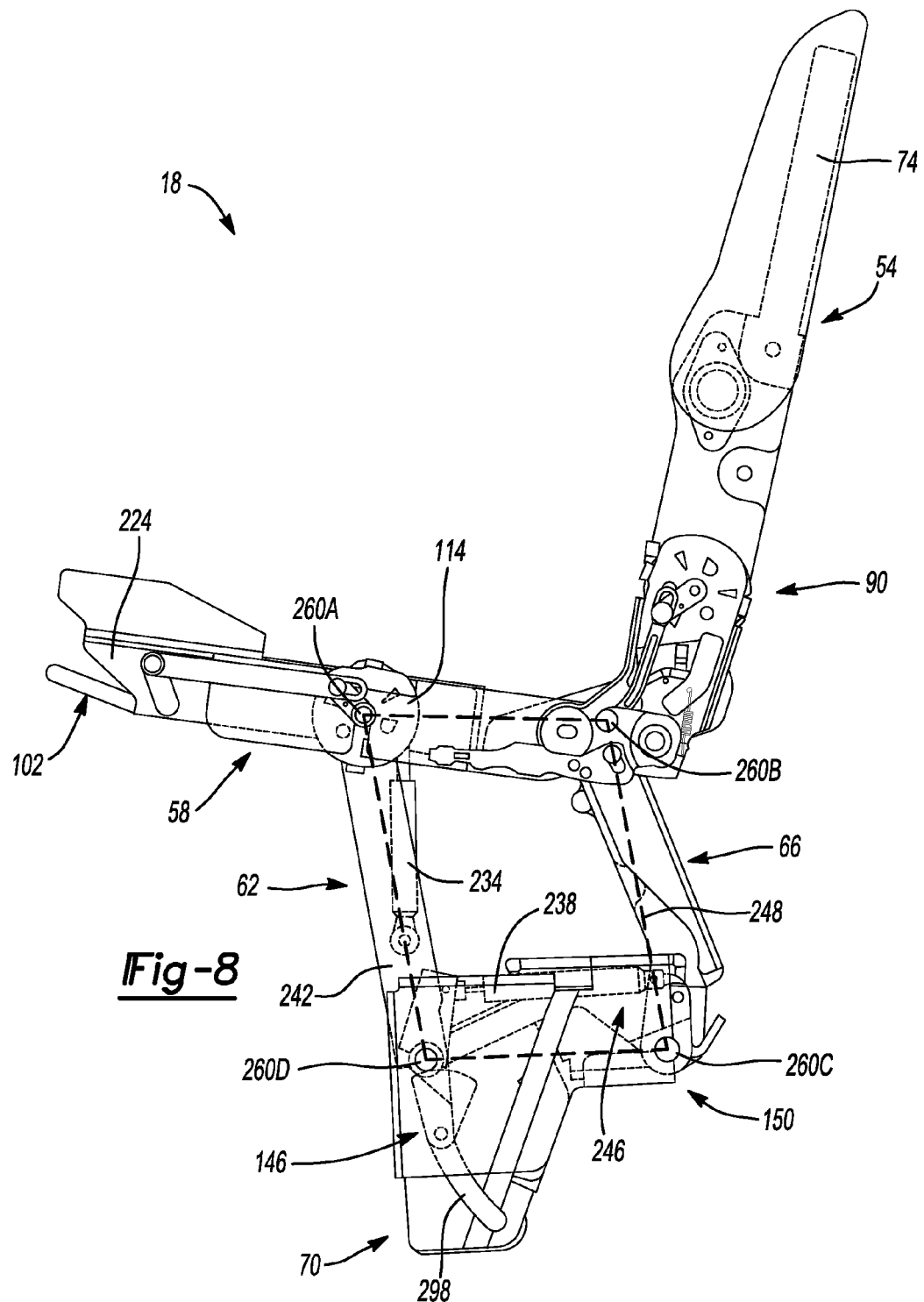
FIG. 8 is a side view of the seat of FIG. 7 moved to an optional adjusted deployed position according to the principles of the present disclosure.

With particular reference to FIGS. 7-9, the fore-aft adjustment feature of the outboard seat assemblies 18 will now be discussed in greater detail. As briefly discussed above, release mechanism 102 can be actuated to release rotational adjustment/locking mechanisms 114 and allow seat assembly to be translated in a forward and/or rearward direction. In this regard, damper assembly 234 can provide a biasing force urging seat assembly 18 to a rearward position, as shown in FIG. 7. To adjust seat assembly 18 to a forward position, such as shown in FIG. 8, the release mechanism 102 can be actuated by pivoting actuation member 222 upwards to drive linking member 226 and lever 214 to rotate shaft 190, as discussed above. This action can disengage pawls 202 from toothed outer case 194 and thus allow front legs 62 to pivot relative to seat bottom 58 within the predetermined range of motion set by rotational adjustment/locking mechanisms 114.

Figure 2:
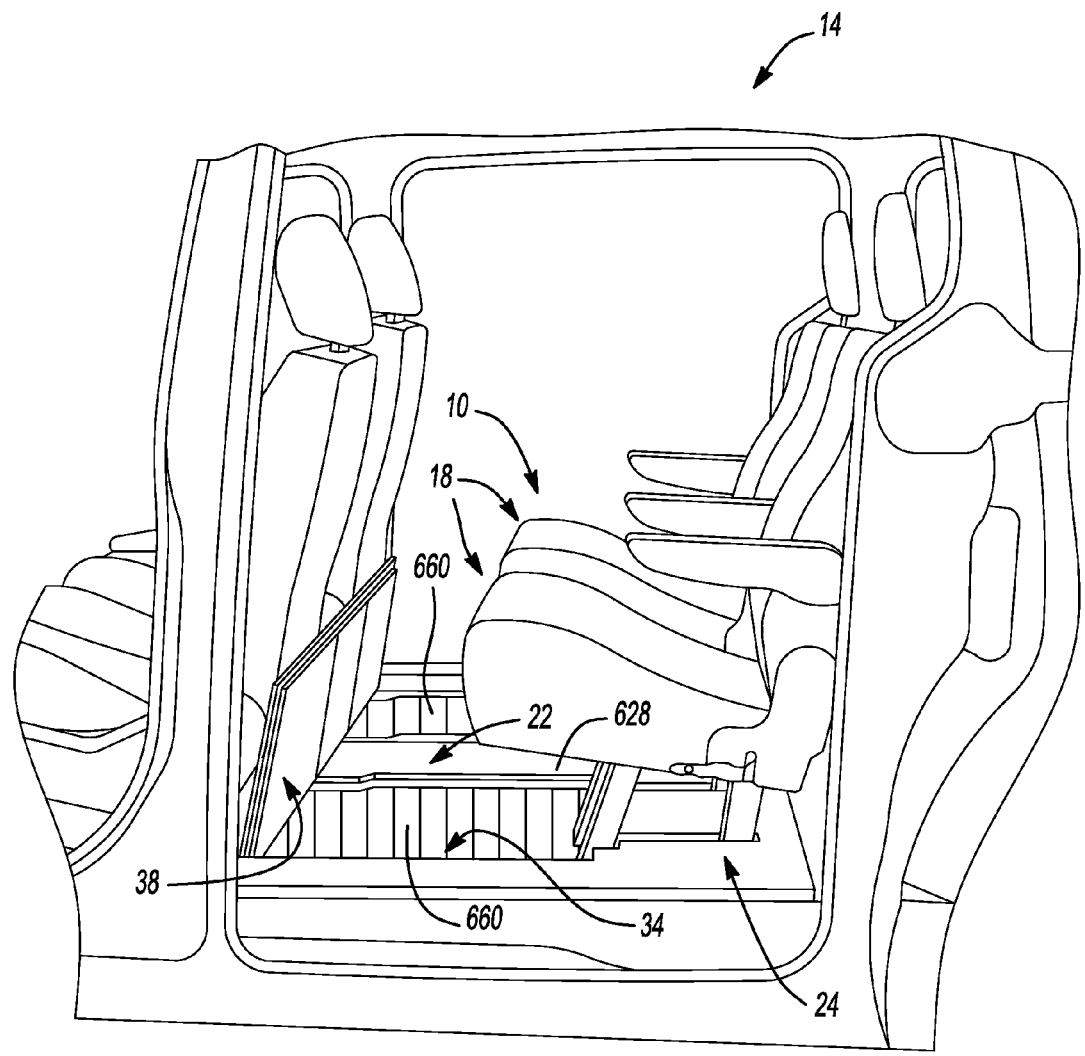
FIG. 2 is a side view of the exemplary seating arrangement of FIG. 1 illustrating covers of seat receiving recesses in an open position according to the principles of the present disclosure.

With the pawls 202 disengaged, seat assembly can be translated to the forward position shown in FIG. 8, or a position between the rearward and forward positions of FIGS. 7 and 8, respectively. Actuating the release mechanism 102 can cause the pawls 202 to return to their biased engagement position with toothed outer case 194 and thus lock seat assembly 18 in a desired fore-aft position. In translating seat assembly 18 between the fore and aft adjustment positions, the four-bar linkage configuration 248 can pivot about each of the pivot points 260A-D, as shown in FIGS. 2 and 8. Each of the front and rear legs 62, 66 can move within slots or channels 268 and 272 (FIG. 5) formed in the cover 38 and vehicle floor 26, respectively.

Turning now to FIGS. 11-13, the ingress/egress feature will now be discussed in greater detail. The ingress/egress feature can be useful to provide quick access to a rear cargo area and/or third row seating arrangement of the vehicle by rotating or pivoting an outboard seat forward without having to collapse and/or tumble the seat. In one exemplary configuration, the seat assembly 18 can be rotated forward above pivot point 260D while a position of front and rear legs 62, 66 and seat bottom 58 remains the same relative to each other. To rotate the seat assembly 18 forward, the release mechanism 82 can be actuated to disengage or release latching member 166 from latch pin 168 of rear legs 66, as shown in FIGS. 11A and 12A. Upon the rear legs 66 being disengaged from latch mechanisms 150, the seat assembly 18 can be rotated forward about pivot points 260D from the seating position shown in FIG. 11 to the ingress/egress position shown in FIGS. 4 and 12. This ingress/egress feature provides a user or vehicle occupant with an ability to conveniently release and rotate the seat assembly 18 by engaging the release mechanism 82 at the upper outboard corner of seat back 54 and then urging the seat assembly forward from a location inside the vehicle (i.e., in a third row seating area) or outside the vehicle. Seat assembly 18 can be returned to the seating position of FIG. 11 by rotating the seat assembly rearward until latch pin 134 engages latch mechanism 150, upon which latch member 166 will automatically reengage latch pin 134 and secure the rear legs 66 to the vehicle.

Figure 14:
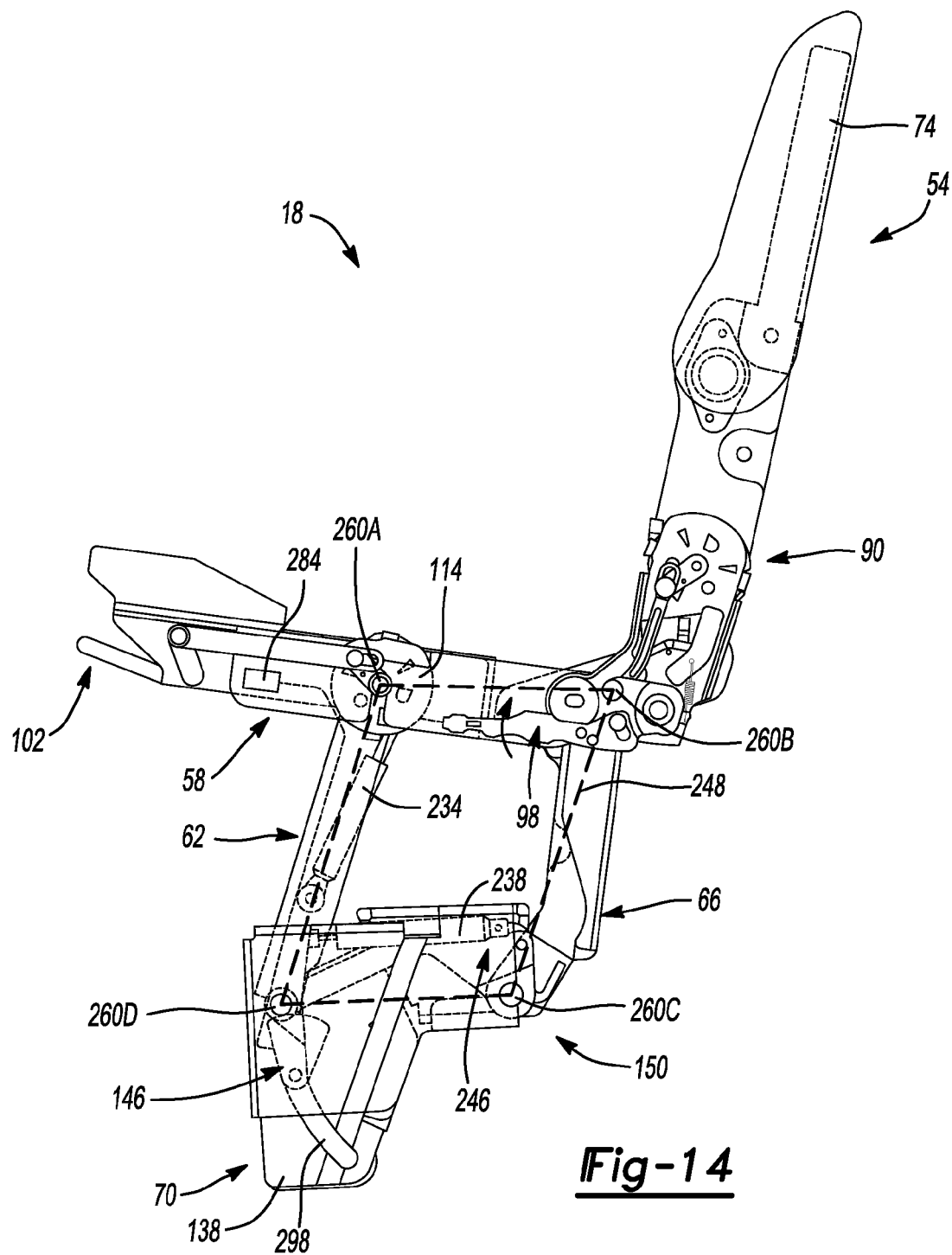
FIG. 14 is a side view of an exemplary outboard seat in a deployed position according to the principles of the present disclosure.

With additional reference to FIGS. 14-20, the stowage feature of seat assemblies 18 will now be described in greater detail. To stow the seat assembly 18, the seat back 54 can be pivoted to a collapsed position substantially parallel to the seat bottom 58 by actuation of the third release mechanism 98. In particular, the actuation member or handle 174 can be moved to the second position to actuate releasable coupling/locking mechanisms 90 to permit folding of seat back 54 to the collapsed position shown in FIG. 15. As discussed above, the third release mechanism 98 can also optionally be associated with armrest 74 such that when the handle 174 is moved to the second position, the armrest 74 can be automatically moved from a deployed position generally perpendicular to the seat bottom 58 to a stowed position generally parallel to the deployed seat back 54, as generally shown in FIG. 14.

In one exemplary configuration, seat assembly 18 can include a fifth release mechanism 284 operatively associated with the latch mechanisms 146, as generally shown in FIG. 15. Each latch mechanism 146 can be coupled to a respective bracket 138 and can include a latch member 288 operable to pivotably secure the lower end 118 of a respective front leg 62 at a first end 292 of a guide slot 298 defined by each bracket 138. The fifth release mechanism 284 can be positioned on seat assembly 18, such as on the outboard side 50 of seat bottom 58 as shown in FIG. 15, or in another conveniently accessible position for a user/occupant of the vehicle. It should be appreciated that fifth release mechanism 284 could alternatively be incorporated into one of the above-described release mechanisms, such as into the third release mechanism 98 in connection with an additional actuation (e.g., third) position.

Figure 16:
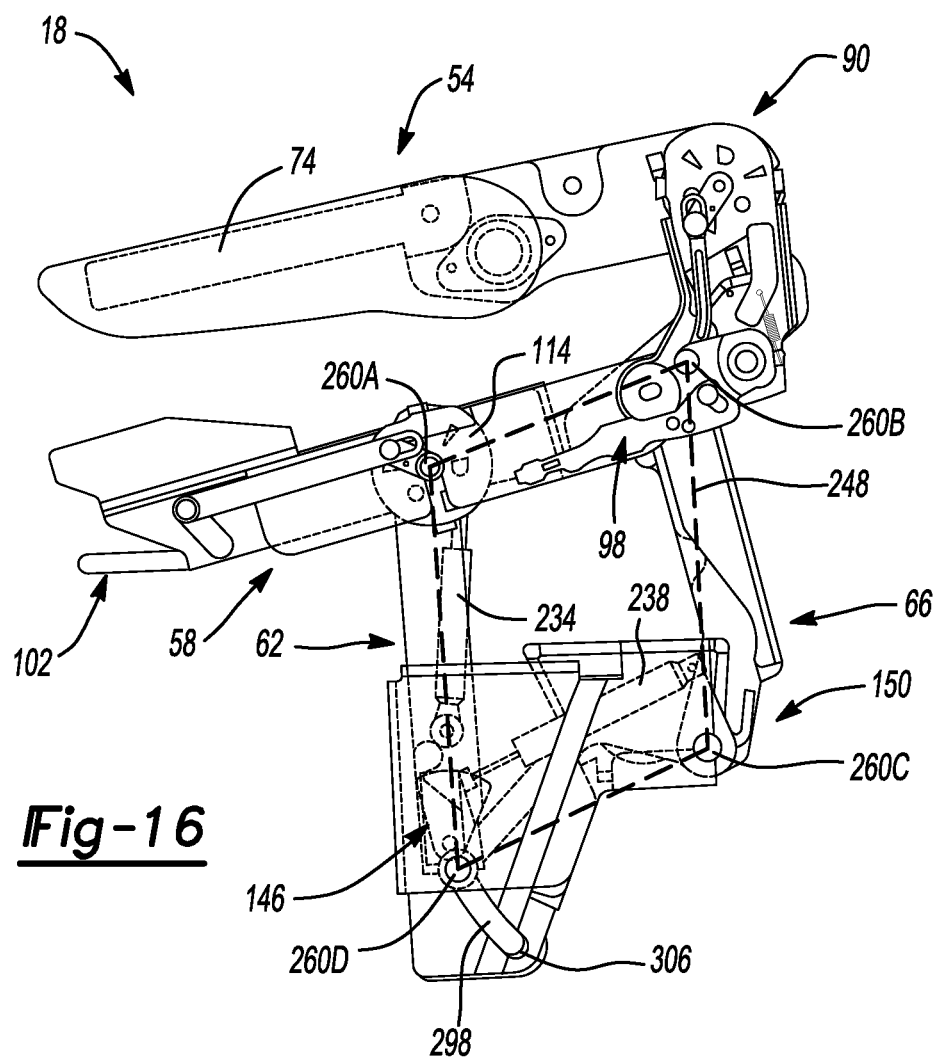
FIG. 16 is a side view of the outboard seat of FIG. 15 illustrating the front legs released from a latched position according to the principles of the present disclosure.

With the seat back 54 collapsed, the fifth release mechanism 284 can be actuated to release front legs 62 from latch mechanisms 146. This can permit front legs 62 to travel downward towards the vehicle floor/frame along guide slot 298 from the first end 292 to a second end 306, as shown in FIGS. 15 and 16. As the front legs 62 travel along slot 298 to the second end 306, the four-bar linkage configuration 248 pivots about each of pivot points 260A-D, as also shown with reference to FIGS. 15-17. In particular, front and rear legs 62, 66 pivot relative to seat bottom 58 about points 260A-B, and relative to linking member 246 about points 260C-D, as shown for example in FIG. 15. As the front legs 62 travel along guide slot 298, the forward end 224 of seat bottom 58 pivots or rotates downward into stowage recess 34 to a forward tipped position 314, as generally shown in FIG. 17 with reference to FIG. 2. During travel of seat assembly 18 along guide slot 298 to the tipped position 314, damper assembly 238 can provide a damped resistance to control the downward travel of seat assembly 18 discussed above.

Figure 18:
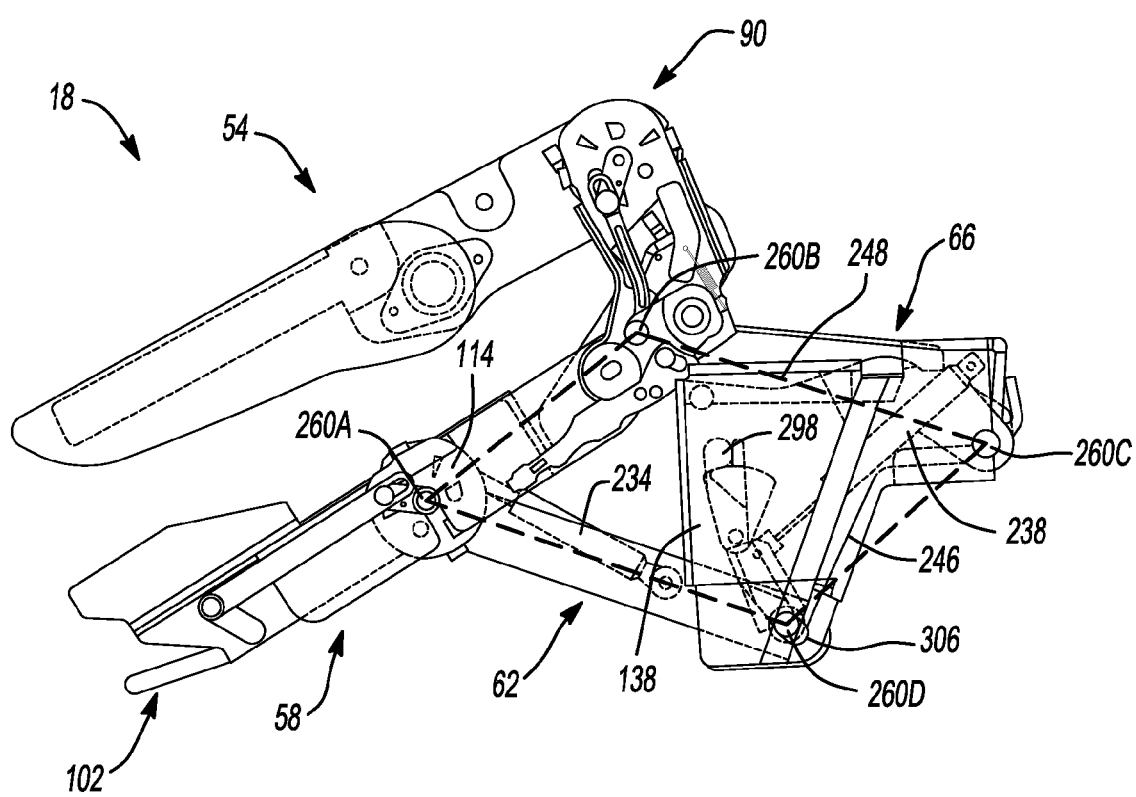
FIG. 18 is a side view of the outboard seat of FIG. 17 illustrating the seat being moved/collapsed toward a stowed position according to the principles of the present disclosure.
Figure 19:
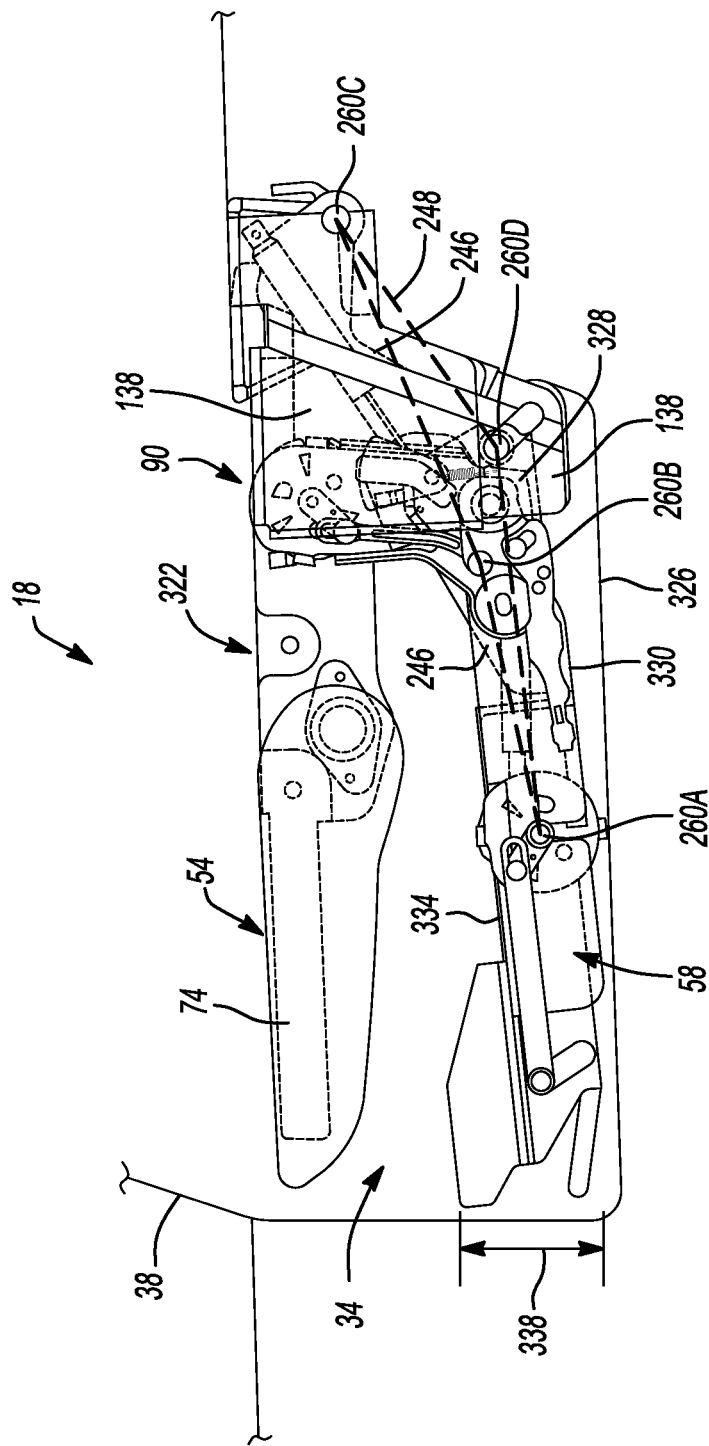
FIG. 19 is a side view of the outboard seat of FIG. 18 illustrating the seat collapsed in the stowed position according to the principles of the present disclosure.

With seat assembly 18 in the forward tipped position 314, the rotational adjustment/locking mechanism 114 can hold the front legs 62 and thus seat assembly 18 from further pivotal collapsing movement. The second release mechanism 86 can be actuated to retract pawls 202 from toothed outer case 194 of each rotational adjustment/locking mechanism 114 to allow free rotational movement of front legs 62 relative to seat bottom 58, as discussed above and shown in FIGS. 17 and 17A. In an alternative configuration, pawls 202 can be automatically retracted upon front legs 62 traveling along guide slot 298 to the second end 306. Upon actuation of second release mechanism 86, seat assembly 18 can be articulated forward and downward into a collapsed, stowed position 322 as shown in FIGS. 18 and 19. As seat assembly 18 articulates downward into the collapsed, stowed position, the front and rear legs 62, 66 can further pivot about points 260A-B relative to seat bottom 58, and about pivot points 260C-D relative to linking member 246.

In one exemplary configuration, seat assembly 18 can be substantially parallel to and rest on a floor 326 of stowage recess 34 when in the stowed position 322, as generally shown in FIG. 19. The front legs 62 can also be adjacent to and substantially parallel to the seat bottom 58 to provide a compact stowed arrangement. Similarly, the rear legs 66 can be adjacent to and substantially parallel to the linking members 246, as shown in FIG. 19. In the stowed position 322, a rearward end 328 of stowed seat assembly 18 can also be forward of the pivot point 260C and adjacent to or forward of the pivot point 260D, as also shown in FIG. 19.

The seat assembly 18 can thus be collapsed and stowed into stowage recess 34 without having to unlatch or decouple front or rear legs 62, 66. Each of the front and rear legs 62, 66 can pivot relative to the seat bottom 58 and linking member 246 in the four bar link configuration 248 as the seat assembly 18 articulates forward and downward to the stowed position 322 to provide the flat load floor configuration shown in FIG. 6. Further, the seat assembly 18 does not have to be turned upside down or flipped over to be collapsed to the stowed position 322. In this regard, the seat assembly 18 can be moved from the deployed position to the stowed position 322 while maintaining a lower side 330 of seat bottom 58, opposite an upper or seating side 334, facing the floor 26, 326 of the vehicle 14.

In the stowed position 322, front legs 62 can nest within seat bottom 58 such that the legs 62 are collapsed within a height 338 of seat bottom 58, as shown in FIG. 19. This nesting can provide for a compact stowed seat assembly arrangement, which in turn can reduce a required depth of stowage recess 34. In one exemplary configuration, the front legs 62 can nest substantially parallel to the seat bottom 58 in the stowed position 322, as generally shown in FIG. 19. Each rear leg 66 can also be positioned inboard of a respective front leg 62 on each side of seat assembly 18 such that the front and rear legs 62, 66 can be positioned laterally adjacent to each other in the stowed position 322, as also shown in FIG. 19 with reference to FIG. 12A. In addition, each linking member 246 can partially nest within a respective rear leg 66 in the stowed position 322 so as to reduce an overall height of the stowed seat assembly 18.

In one exemplary configuration, seat assembly 18 can provide the ingress/egress, fore-aft adjustment and stowage features discussed above while only requiring that the front and rear legs 62, 66 extend through floor 26 via slots 268, 272 to connect the seat bottom 58 to the vehicle 14, as shown for example in FIGS. 1, 2 and 5. In this regard, the lower side 330 of seat bottom 58 can be spaced apart from floor 26 such that an open space is provided between inboard and outboard legs 62, 66 and seat bottom 58 and floor 26. This structural arrangement provides for seat assembly 18 to include the above features while also reducing complexity and reducing weight so as to provide easier adjustment and stowage, as well as under seat storage in the deployed position.

Figure 20:
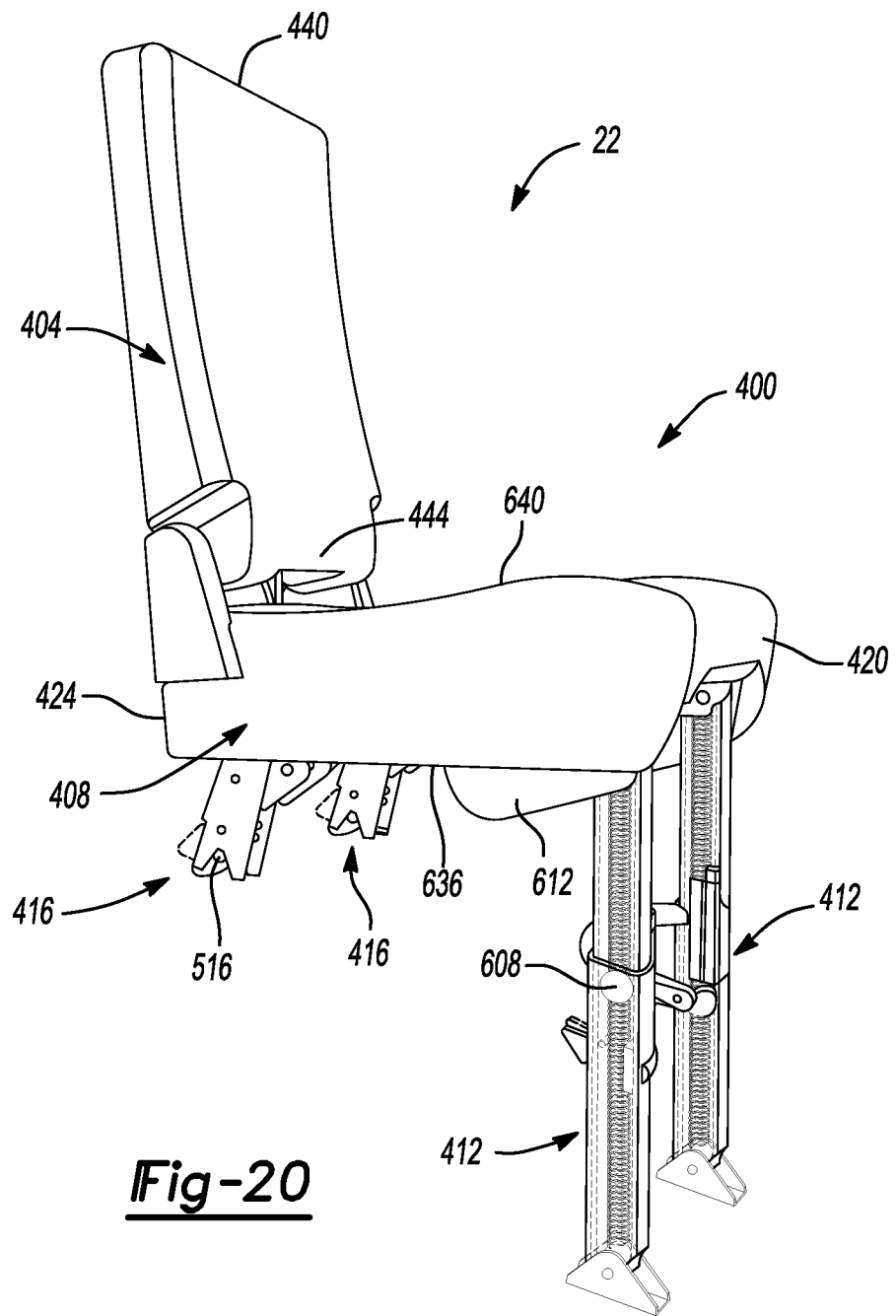
FIG. 20 is a perspective view of an exemplary center seat according to the principles of the present disclosure.

Turning now to FIGS. 20-28, the center seat assembly 22 will now be described in greater detail. As discussed above, center seat assembly 22 can include similar structure and operation as outboard seat assemblies 18 or the exemplary alternative configuration 400 that will be discussed below. In configuration 400, center seat assembly 22 can include a seat back 404, a seat bottom 408, a front pair of leg assemblies 412, and a rear pair of leg assemblies 416, as generally shown in FIG. 20. It should be appreciated that while seat assembly 22 is shown in FIG. 20 with seat cushions or the like associated with seat back 404 and seat bottom 408, the cushions have been removed in FIGS. 21-28 for purposes of clarity.

Figure 21:
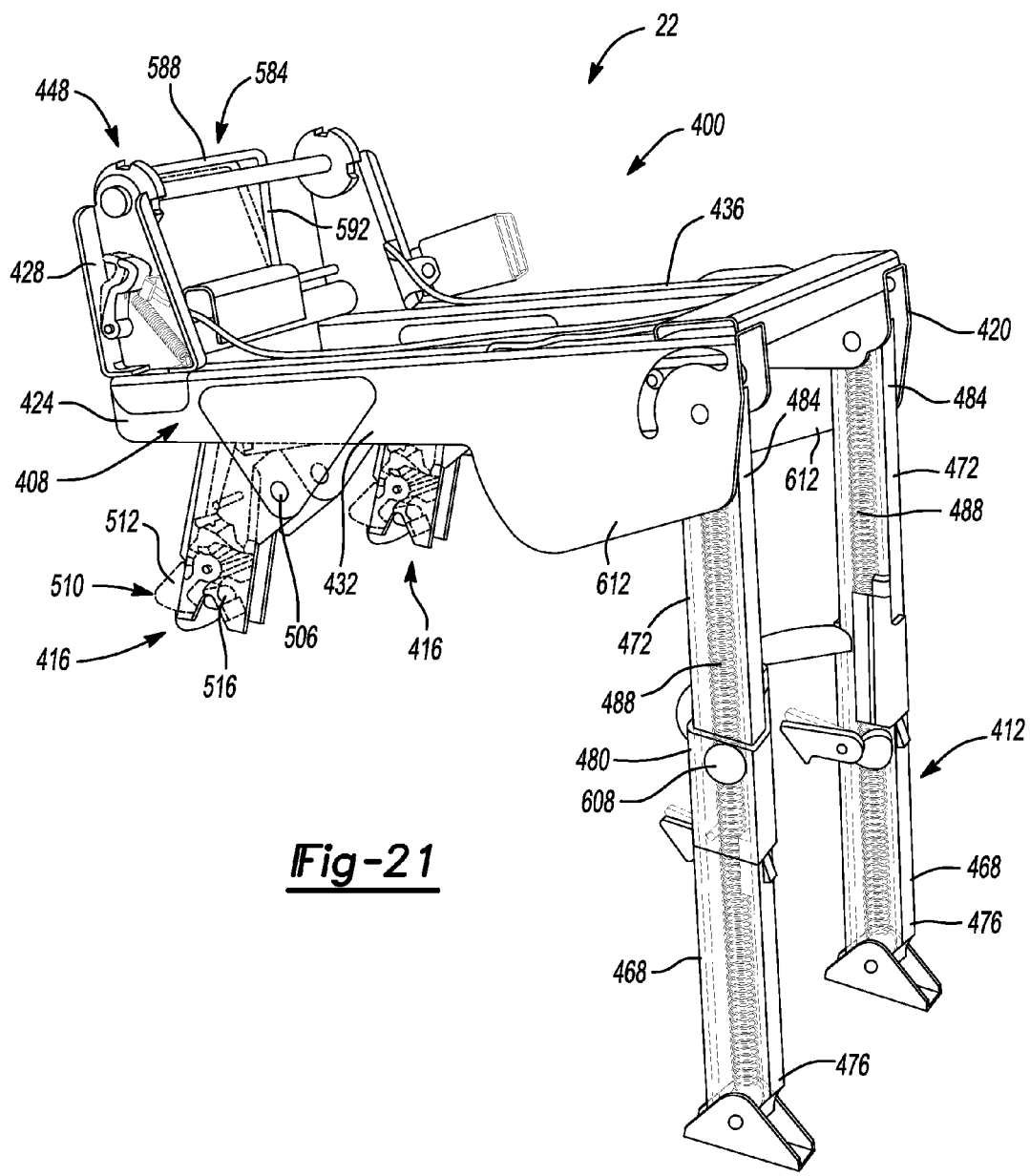
FIG. 21 is a partial perspective view of the seat of FIG. 20 according to the principles of the present disclosure.
Figure 22:
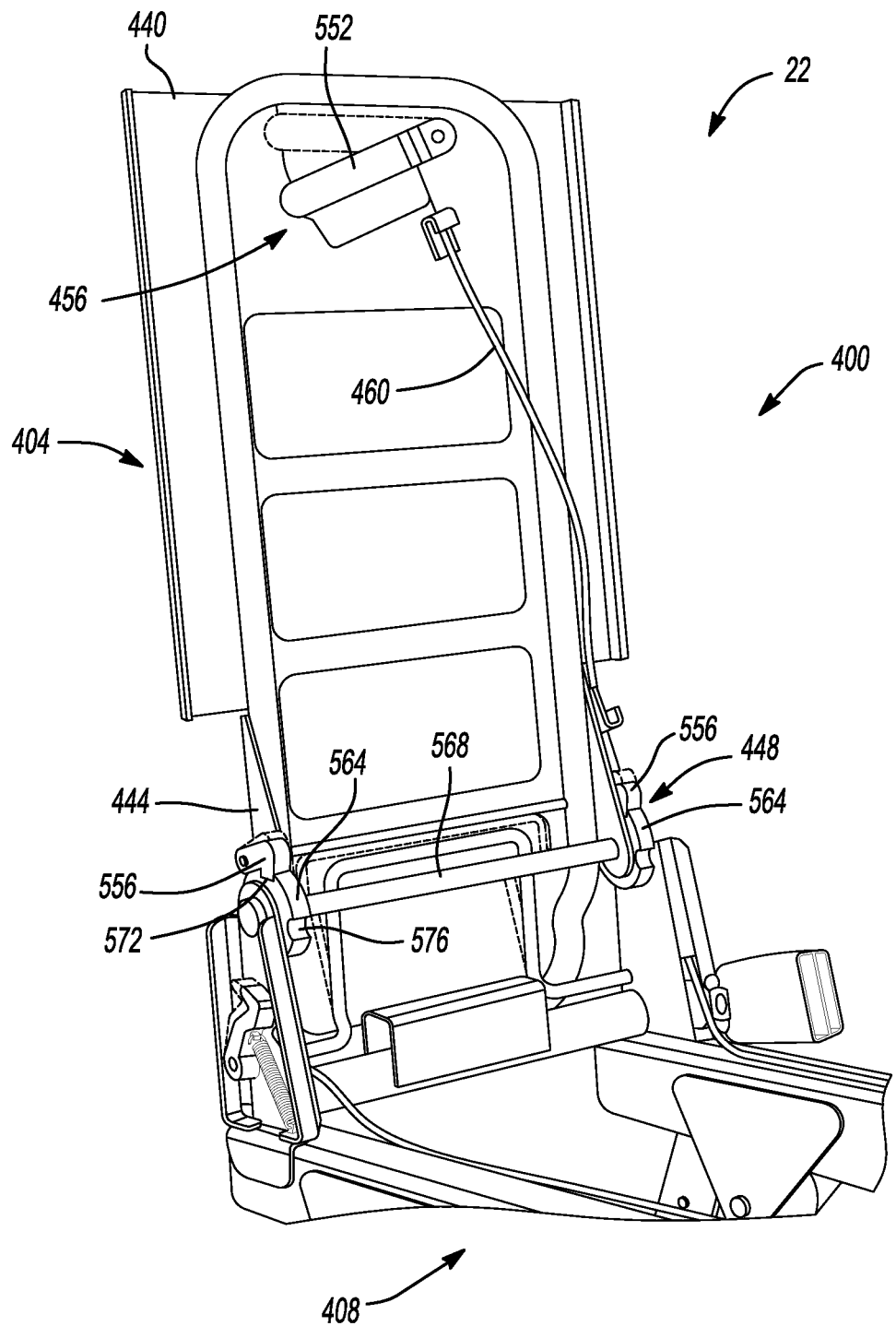
FIG. 22 is a partial perspective view of the seat of FIG. 20 illustrating actuation of a latch release mechanism according to the principles of the present disclosure.

Seat bottom 408 can include a forward end 420, a rearward end 424 and a pair of bracket assemblies 428 fixed to respective first 432 and second 436 sides of seat bottom 408 at rearward end 424. Seat back 404 can include an upper end 440 and a lower end 444 pivotably coupled to bracket assemblies 428 via a lockable coupling arrangement 448, as generally shown in FIGS. 21-22. The upper end 440 of seat back 404 can include a release mechanism 456 operatively associated with coupling arrangement 448 via a cable 460 or other connection mechanism.

The front leg assemblies 412 can each include an outer leg 468 and an inner leg 472. Outer leg 468 can be pivotably coupled to the vehicle frame at a lower end 476 and configured to telescopically receive a lower end of inner leg 472 at an upper end 480. Inner leg 472 can include an upper end 484 pivotably coupled to the forward end 420 of seat bottom 408. Front leg assemblies 412 can also include a spring or other resilient member 488 to control telescoping motion of the inner and outer legs 468, 472, as well as a latch member 492 selectively fixing the inner and outer legs 468, 472 to each other.

Figure 24:
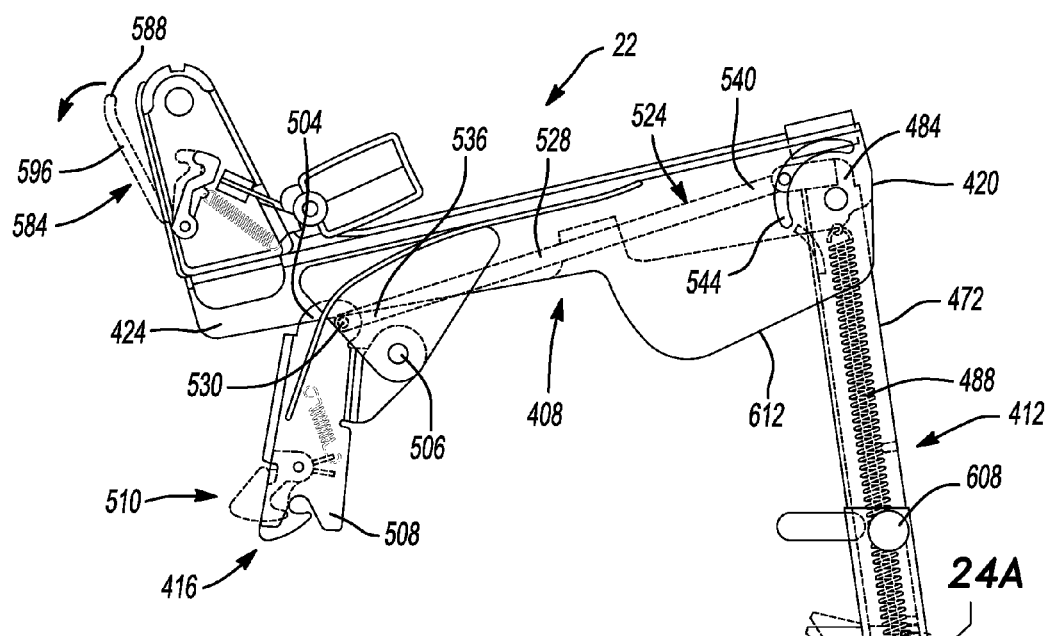
FIGS. 24 and 24A illustrate actuation of a latch release mechanism to release the front legs from a locked position to a collapsible position according to the principles of the present disclosure.

Rear leg assemblies 416 can each include an upper end 504 pivotably coupled to the rearward end 424 of seat bottom 408 at an attachment point 506, and a latch mechanism 510 coupled to a lower end 508, as shown for example in FIGS. 21 and 24. Latch mechanism 510 can include a latch member 512 configured to selectively engage a striker or pin member 516 connected to the vehicle floor to secure the rear leg assemblies 416 thereto.

A pair of linking assemblies 524 can operatively couple a respective front and rear leg to each other, as generally shown in FIGS. 24-27. Each linking assembly 524 can include a linking member 528 having a rearward end 536 and a forward end 540. Rearward end 536 can be pivotably coupled to upper end 504 of each rear leg assembly 416 at an attachment point 530. Forward end 540 of linking member 528 can be pivotably coupled to upper end 484 of inner leg 472. Forward end 540 can also be coupled to an arcuate guide slot 544 formed in the forward end 420 of seat bottom 408.

Release mechanism 456 can include an actuation member or handle 552 coupled to a pair of latch members 556 of coupling arrangement 448 via cable 460. Coupling arrangement 448 can include a pair of cam members 564 rotationally coupled to each bracket assembly 428 and fixed to each other via shaft member 568. Each cam member 564 can include a first detent 572 and a second detent 576 corresponding to a deployed and collapsed position of seat back 404, respectively. Latch members 556 can be biased against cam members 564 so as to selectively engage detents 572, 576, as will be discussed below.

Figure 26:
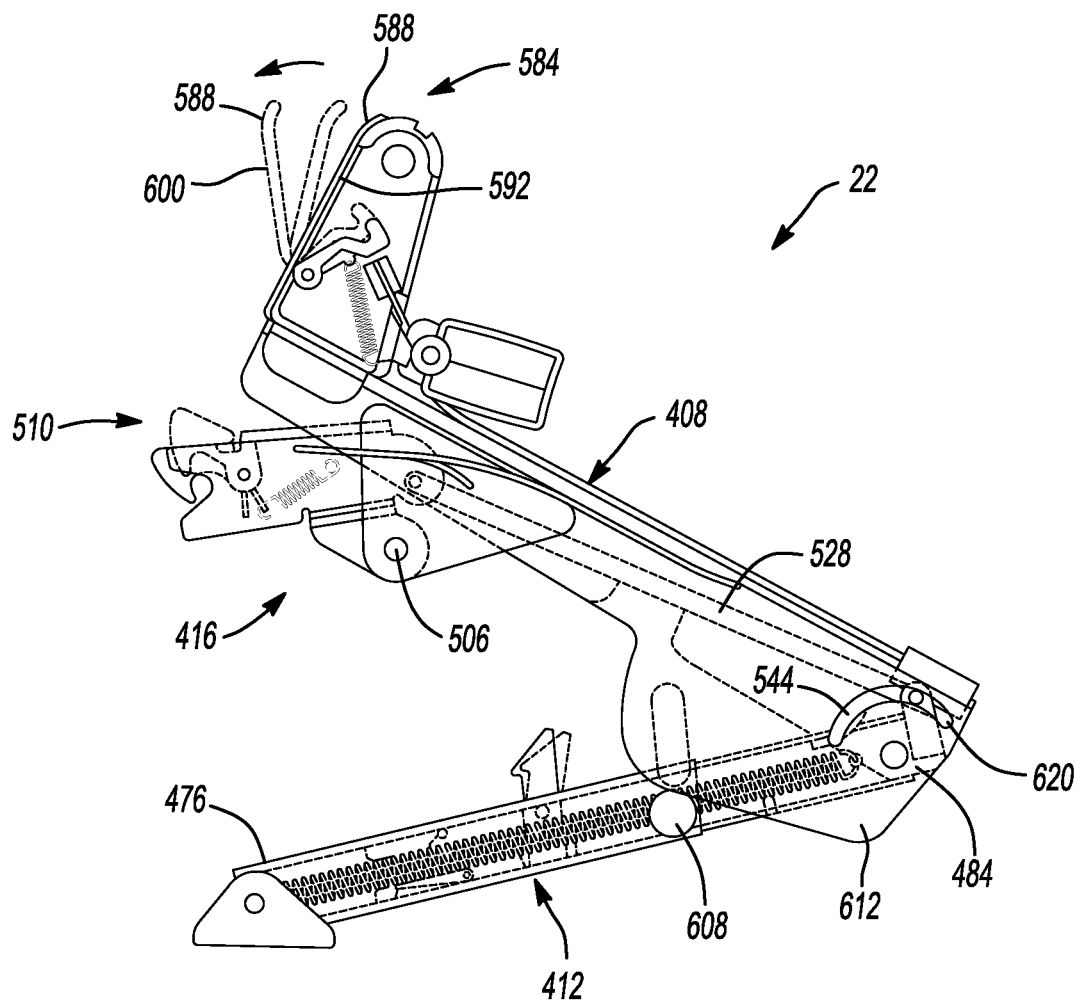
FIG. 26 is a side view of the seat of FIG. 20 being moved/collapsed toward a stowed position according to the principles of the present disclosure.

A leg release mechanism 584 can be operatively associated with bracket assemblies 428 and can be coupled via a cable or the like to the latch members 492 of front leg assemblies 412 and the latch mechanisms 510 of rear leg assemblies 416. Release mechanism 584 can include a handle 588 extending upward relative to seat bottom 408 and positioned so as to be accessible when seat back 404 is folded or collapsed to the stowed position. The release mechanism 584 can be biased to a rest position 592 and can include a first actuation position 596 for releasing front leg latch member 492 and a second actuation position 600 for releasing rear leg latch mechanisms 510, as generally shown in FIGS. 24 and 26.

Figure 23:
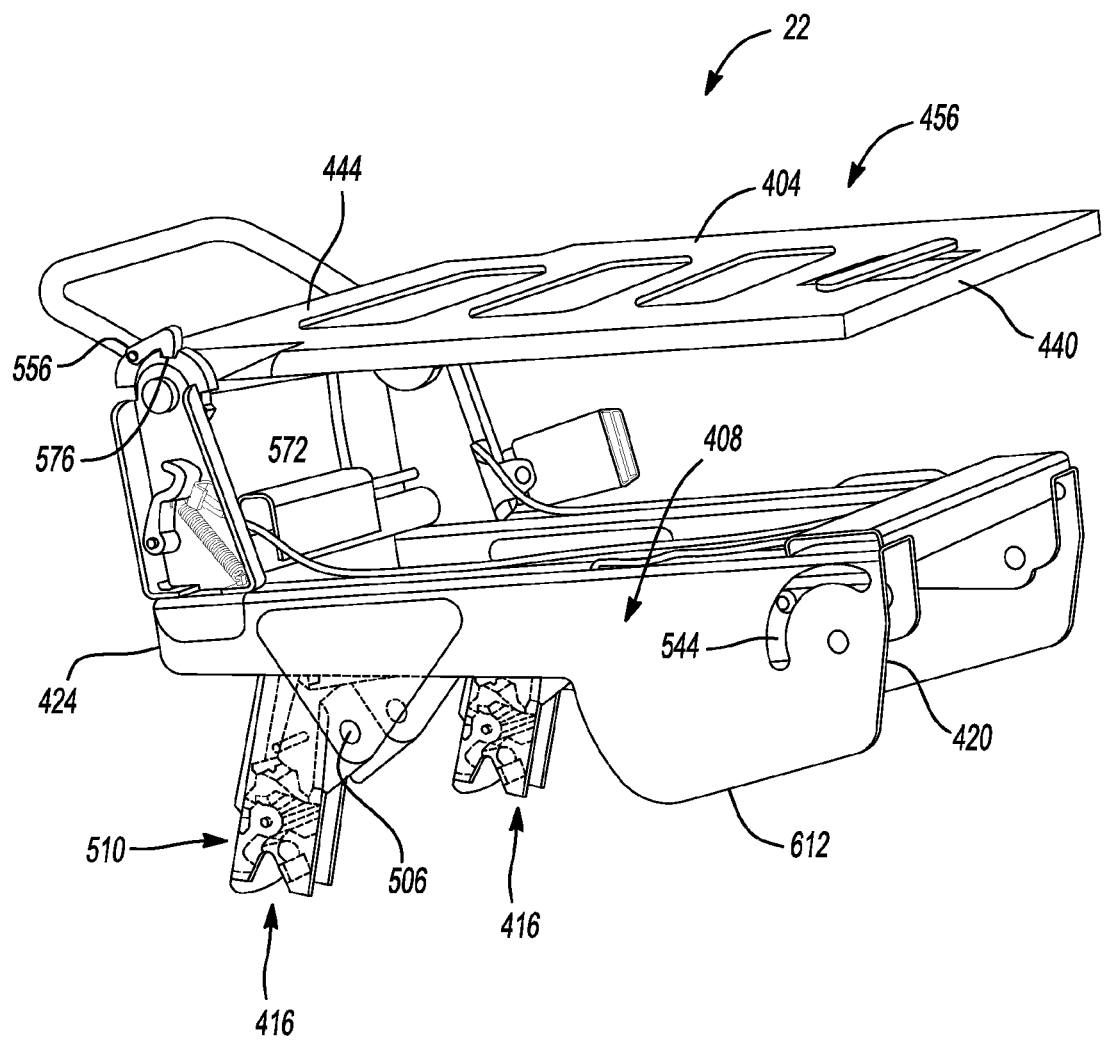
FIG. 23 is a partial perspective view of the seat of FIG. 20 illustrating the seat back in a collapsed position according to the principles of the present disclosure.
Figure 28:
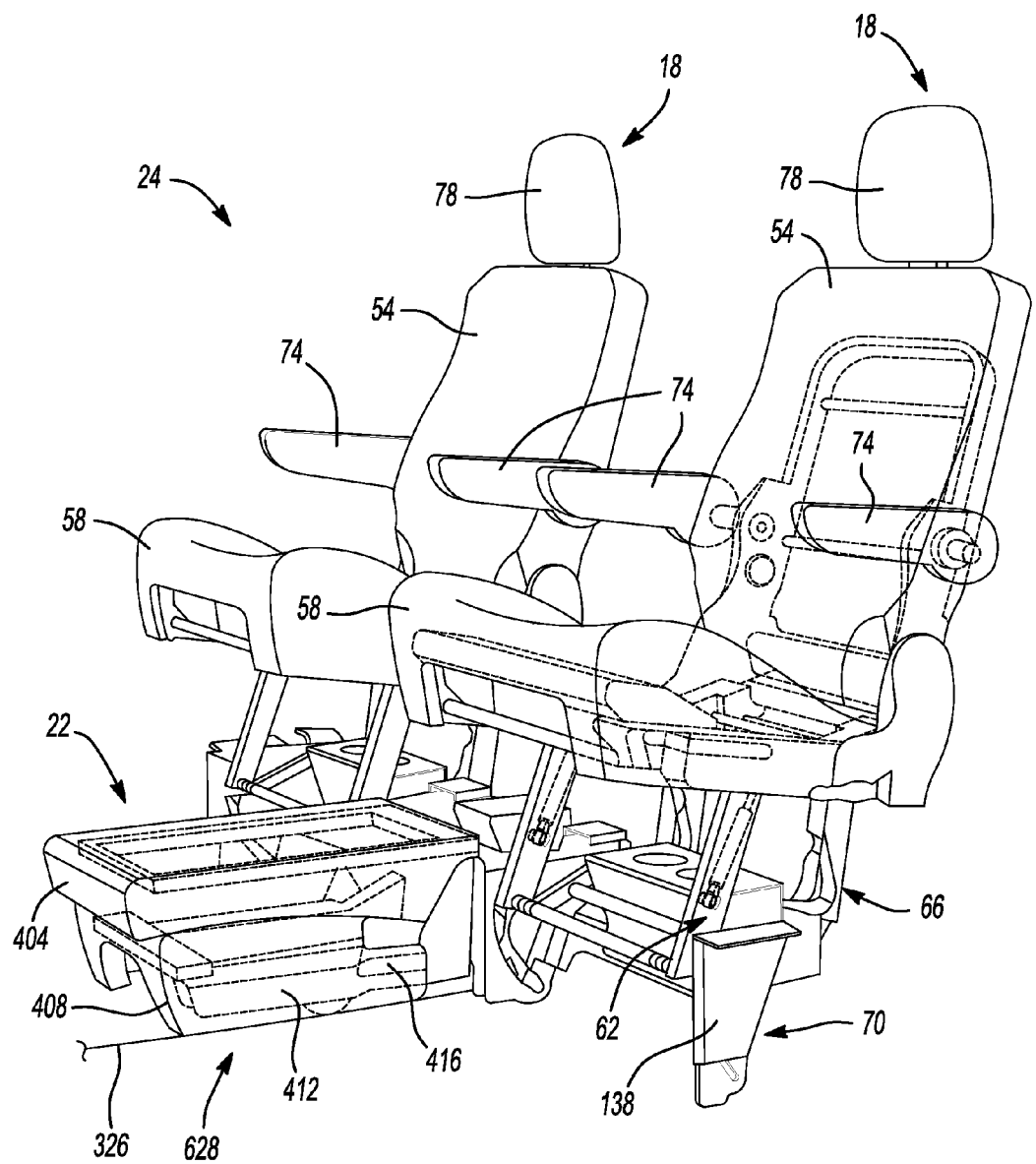
FIG. 28 is a perspective view of the seat of FIG. 20 collapsed in the stowed position with the outboard seats in a deployed position according to the principles of the present disclosure.

To articulate seat assembly 22 from the deployed position shown in FIG. 20 to the stowed position shown in FIG. 28, the release mechanism 456 can be actuated to rotate or pivot latch members 556 out of or away from the first detent 572 associated with seat back 404 in the deployed position, as shown in FIG. 22. Seat back 404 can then be pivoted or rotated to the collapsed position where latch members 556 can engage second detent 576, as generally shown in FIG. 23.

Figure 24A:
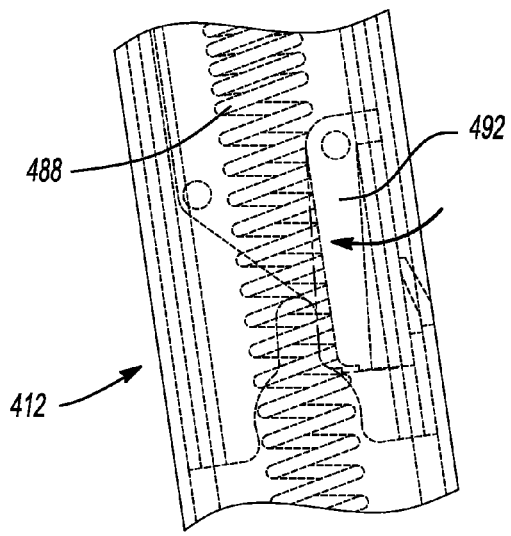
Figure 25:
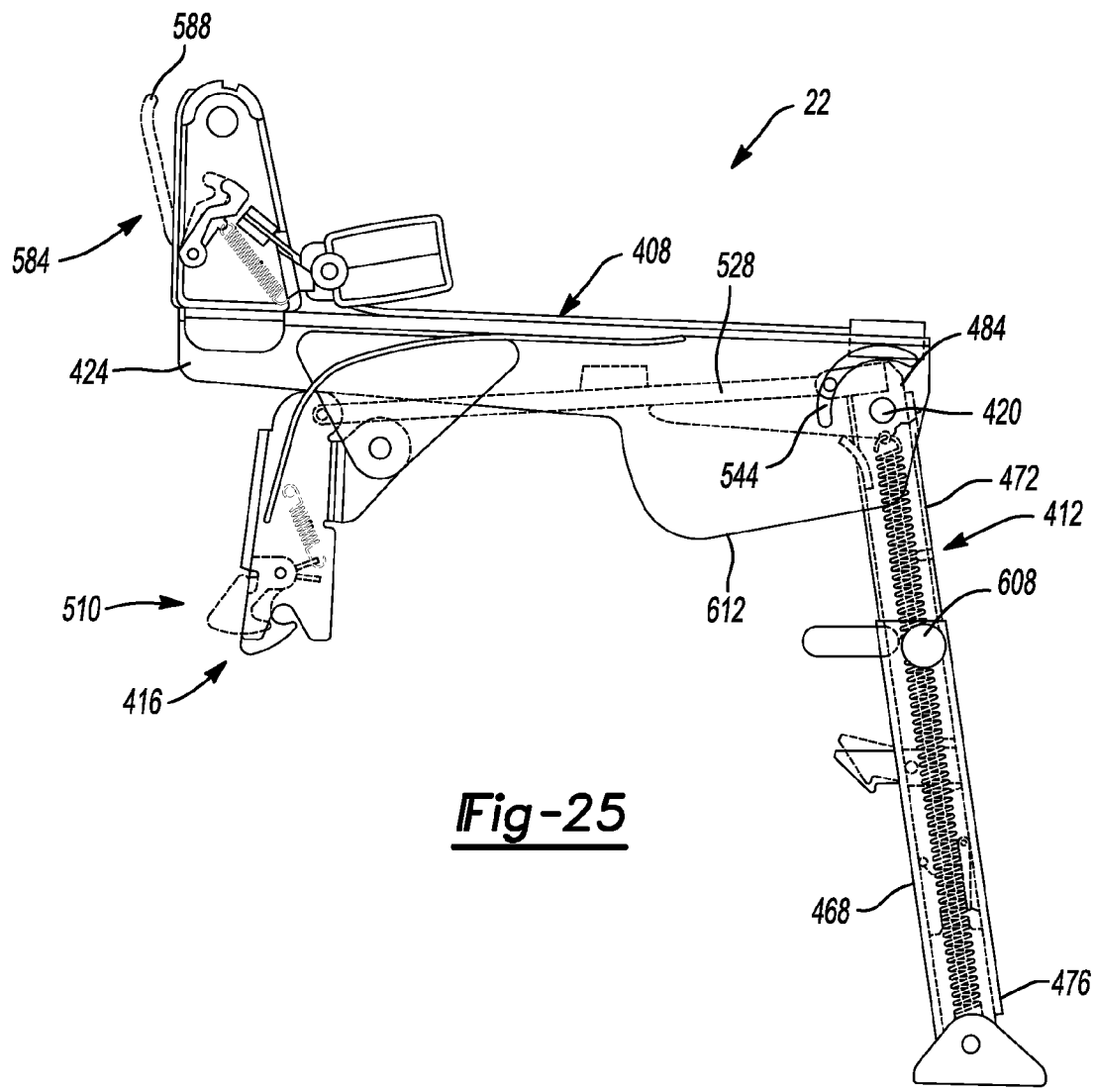
FIG. 25 is a partial side view of the seat of FIG. 20 illustrating the front legs in a collapsed position according to the principles of the present disclosure.

Leg release mechanism 584 can then be moved to the first actuation position 596 to release front leg latch members 492, as generally shown in FIGS. 24 and 24A. Once latch members 492 are released, inner front legs 472 can telescopically collapse into outer legs 468 such that forward end 420 of seat bottom 408 can rotate or tip downward toward the vehicle floor, as generally shown in FIG. 25. With the front leg assemblies 412 collapsed, release mechanism 584 can be actuated or moved to the second actuation position 600 to release latch members 512 from latch pins 516, as shown in FIG. 26. Upon release of rear leg assemblies 416 from being secured to the vehicle, seat assembly 22 can be translated or articulated forward such that the front leg assembly 412 pivots about the lower end 476 of outer leg 468 and the upper end 484 of inner leg 472.

Figure 27:
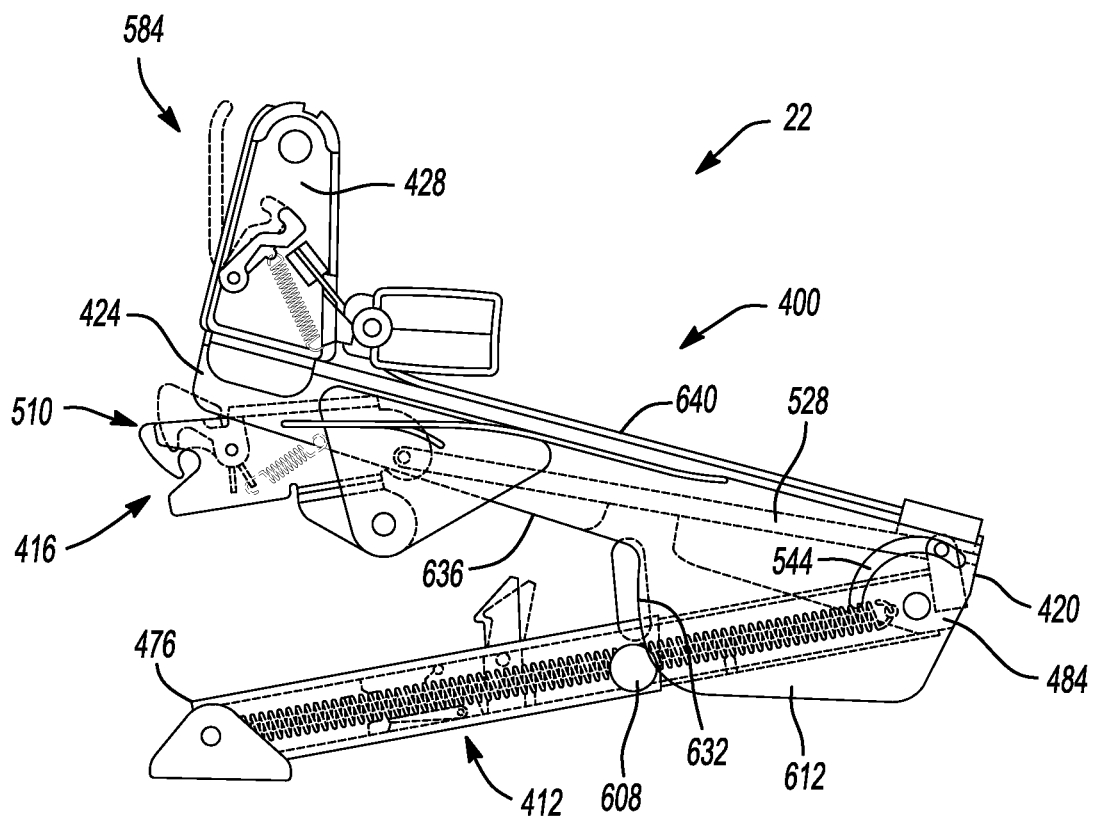
FIG. 27 is a side view of the seat of FIG. 20 being moved/collapsed toward the stowed position according to the principles of the present disclosure.

Front leg assemblies 412 can each also include a cam follower 608 configured to ride against or follow a cam portion 612 of the seat bottom 408 disposed at the first and second sides 432, 436 of the forward end 420 thereof. The cam portions 612 can be sized and shaped such that as the seat assembly 22 is articulated forward upon release of the rear leg assemblies 416, the linking member 528 can be urged to travel along the arcuate guide slot 544 towards a forward end 620 thereof as seat bottom 408 pivots relative to the upper ends 484 of inner legs 472. As the linking member 528 travels to the forward end 620 of slot 544, the rear leg assemblies 416 can be rotated about attachment point 506 to a retracted position based on the spaced relationship of the linking member attachment point 530 to the attachment point 506, as generally shown in FIGS. 26 and 27.

Seat assembly 22 can then be articulated downward to a stowed position 628, as generally shown in FIGS. 2 and 28. As the seat assembly approaches the stowed position 628, the cam portion 612 can be sized and shaped to extend the front leg assemblies 412 as the cam follower 608 moves about a rearward portion 632 of cam portion 612, as generally shown in FIG. 27. In the stowed position 628, rear leg assemblies 416 can be rotated to the retracted position at least substantially within seat bottom 408 and substantially parallel thereto, and seat bottom 408 can be substantially parallel to the vehicle floor and the front leg assemblies 412. The rearward end 424 of the seat bottom 408 can also be positioned adjacent to the pivot coupling point of the lower end 476 of outer legs 468, as generally shown in FIGS. 27 and 28. In addition, similar to seat assemblies 18, a lower side 636 of seat bottom 408 opposite an upper seating side 640 can remain facing the floor 26, 326 of the vehicle during movement between the deployed position and the stowed position. In addition, a portion of the rear leg assemblies 416 can straddle the front leg assemblies 412 to provide a more compact stowed seating configuration for seat assembly 22, as generally shown in FIG. 28 with reference to FIG. 27.

Figure 29:
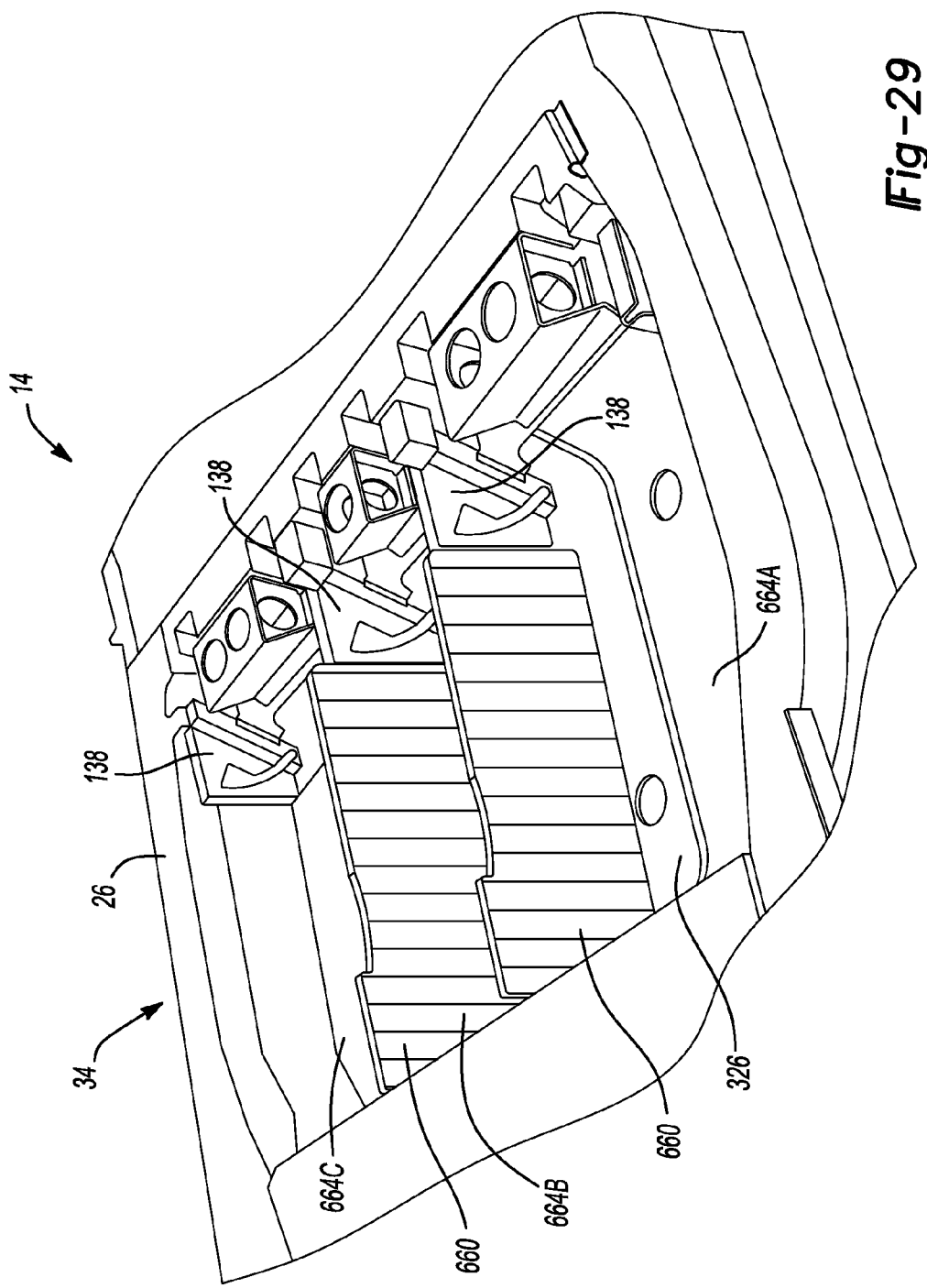
FIG. 29 is a perspective view of a vehicle floor configuration having a recess and dividers therein according to the principles of the present disclosure.

Turning now to FIGS. 29-31A, the stowage recess 34 and associated cover 38 will now be discussed in greater detail. In one exemplary configuration, the stowage recess 34 can include a single recess 34 with the floor 326 formed into the floor 26, as generally shown in FIG. 29. The single recess 34 can extend cross-car and be sized and shaped to receive each of the outboard and center seat assemblies 18, 22 therein. The recess 34 can include a pair of structural dividers 660 configured to separate recess 34 into three regions or compartments 664A-C, one for each seat assembly as generally shown in FIGS. 29 and 30. Dividers 660 can also provide support for recess covers 38 to act as a structural load floor for supporting occupants, cargo and the like.

Figure 31:
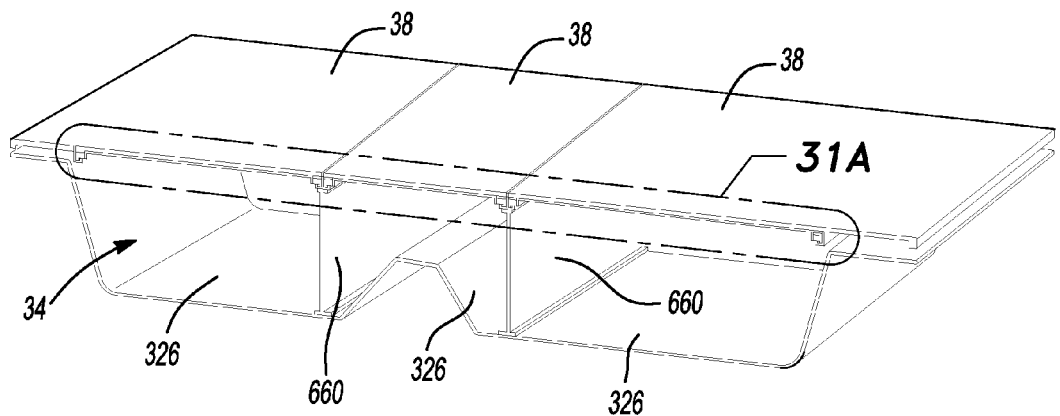
FIGS. 31 and 31A are views of the support structure of FIG. 30 cooperating with the dividers and covers according to the principles of the present disclosure.
Figure 31A:
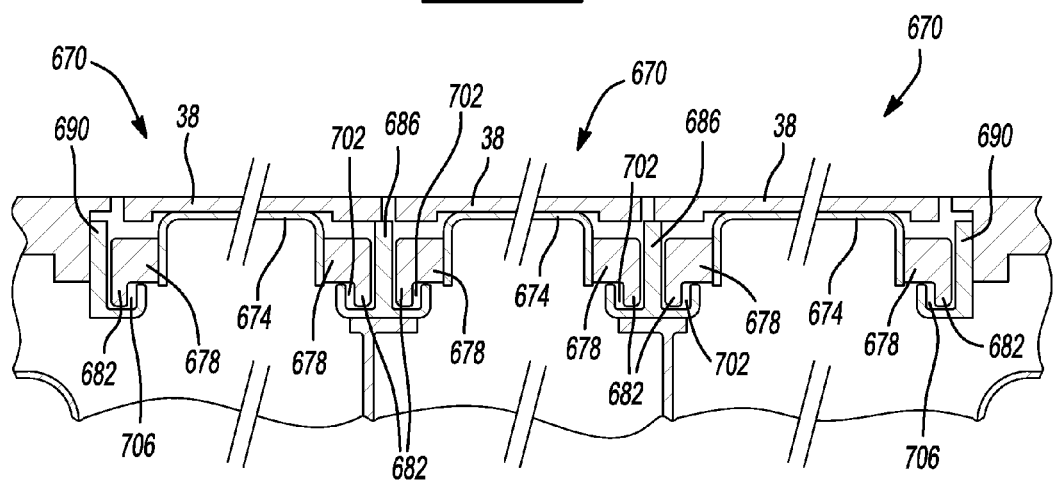

Each load floor cover 38 can include a structural sub-assembly 670 for reinforcement. The sub-assembly 670 can include a plurality of cross members 674 for each load floor cover 38. Each cross member 674 can include terminal ends 678 having coupling members 682 configured to be received in inboard bracket assemblies 686 and/or outboard bracket assemblies 690. Inboard bracket assemblies 686 can be associated with upper ends 694 of each structural divider 660 and the outboard bracket assemblies 690 can be associated with outboard sides 698 of the single recess 34. Inboard bracket assemblies 686 can include longitudinal channels 702 formed about respective inboard and outboard sides thereof, as generally shown in FIGS. 31 and 31A. Similarly, outboard bracket assemblies 690 can each include a longitudinal channel 706 formed about an inboard side thereof, as also shown in FIGS. 31 and 31A.

The coupling members 682 can interlock the cross members 674 to each other and to the frame of the vehicle 14 via the longitudinal channels 702 positioned relative to dividers 660 and/or longitudinal channels 706 positioned relative to the outboard sides 698 of recess 34. By using the structural sub-assemblies 670, the recess covers 38 can provide sufficient strength while being lighter in weight so as to be easier to manipulate (e.g., open and close) by a vehicle occupant or user.

What is claimed is:

1. A stowable seat assembly for a motor vehicle having a floor, the seat assembly comprising:
   a seat bottom having a forward portion and an opposite rearward portion, and an upper or seating side and an opposite lower side facing the vehicle floor;
   a seat back having an upper portion and a lower portion, the seat back lower portion pivotably coupled to the seat bottom rearward portion;
   a front pair of legs each having an upper end and an opposite lower end, each upper end pivotably coupled to respective first and second lateral sides of the forward portion of the seat bottom via releasable locking mechanisms, each lower end pivotably coupled to the vehicle via first latch mechanisms configured to enable selective translation of the front legs;
   a rear pair of legs each pivotably coupled at an upper end to the respective first and second lateral sides of the seat bottom at the rearward portion, and releasably coupled at a lower end to a second latch mechanism selectively securing the rear legs to the vehicle; and
   a pair of linking members pivotably coupling the lower ends of the front and rear legs coupled to the first lateral side of the seat bottom to each other and the front and rear legs coupled to the second lateral side of the seat bottom to each other, the linking members adapted to be disposed below the floor of the vehicle;
   the seat assembly being selectively movable from a deployed position to a stowed position whereby the seat bottom is pivoted forward about the front and rear legs to the stowed position while maintaining the lower side of the seat bottom facing the vehicle floor and the front and rear legs pivotably coupled to the vehicle and the seat bottom.

2. The stowable seat assembly of claim 1, further comprising a first actuation mechanism operatively associated with the first latch mechanism, the first actuation mechanism configured to selectively release the front legs from the first latch mechanism such that each front leg articulates downward about a guide slot to a forward tipped position.

3. The stowable seat assembly of claim 2, further comprising a second actuation mechanism coupled to the seat assembly and operatively associated with the releasable locking mechanisms, the second actuation mechanism operable to disengage the releasable locking mechanisms thereby permitting the upper end of the front legs to pivot relative to the seat bottom to move the seat assembly from the forward tipped position to the stowed position.

4. The stowable seat assembly of claim 1, wherein a pivoting four-bar linkage configuration is formed on the first and second lateral sides of the seat assembly by the seat bottom, one of the front and rear legs, and one of the linking members.

5. The stowable seat assembly of claim 1, wherein the front legs are nested substantially within the seat bottom when the seat assembly is in the stowed position.

6. The stowable seat assembly of claim 1, wherein the front legs are substantially parallel to the seat bottom in the stowed position.

7. The stowable seat assembly of claim 1, wherein the linking members are substantially parallel to the rear legs in the stowed position.

8. The stowable seat assembly of claim 1, further comprising a damping member pivotably coupled to a forward end of one of the linking members adjacent a corresponding front leg and to the vehicle to control downward travel of the seat assembly upon releasing the front legs from the first latch mechanism.

9. The stowable seat assembly of claim 1, wherein the rearward portion of the seat bottom is forward of the lower ends of the front and rear legs in the stowed position.

10. The stowable seat assembly of claim 1, further comprising an actuation mechanism positioned about the forward portion of the seat bottom and operatively coupled to the releasable locking mechanism, the actuation mechanism configured to selectively release the releasable locking mechanism to permit forward and rearward translational adjustment of the seat bottom relative to the vehicle in the deployed position, the front and rear legs pivoting relative to the vehicle and the seat bottom during the forward and rearward adjustment.

11. The stowable seat assembly of claim 10, further comprising a biasing member coupled to the lower end of one of the front legs and the seat bottom, the biasing member biasing the seat assembly to a deployed rearward adjustment position.

12. The stowable seat assembly of claim 1, further comprising a second actuation mechanism coupled to the seat back and operatively associated with the second latch mechanism, the second actuation mechanism configured to selectively release the rear legs from the second latch mechanism whereby the seat assembly can be pivoted forward about the lower end of the front legs while the releasable locking mechanism prevents pivoting of the front and rear legs relative to the seat bottom.

* * * * *